(12) United States Patent
Rowe

(10) Patent No.: US 9,111,412 B2
(45) Date of Patent: Aug. 18, 2015

(54) CASINO GAMES

(75) Inventor: Richard E. Rowe, Las Vegas, NV (US)

(73) Assignee: Think Tek, Inc., Las Vegas, NV (US)

( * ) Notice: Subject to any disclaimer, the term of this patent is extended or adjusted under 35 U.S.C. 154(b) by 273 days.

(21) Appl. No.: 13/348,494

(22) Filed: Jan. 11, 2012

(65) Prior Publication Data
US 2012/0115590 A1 May 10, 2012

Related U.S. Application Data

(63) Continuation-in-part of application No. 12/612,976, filed on Nov. 5, 2009, now Pat. No. 8,167,695.

(60) Provisional application No. 61/436,341, filed on Jan. 26, 2011.

(51) Int. Cl.
*G07F 17/32* (2006.01)

(52) U.S. Cl.
CPC ............ *G07F 17/3225* (2013.01); *G07F 17/32* (2013.01); *G07F 17/3272* (2013.01); *G07F 17/3293* (2013.01)

(58) Field of Classification Search
USPC ..................................................... 463/25, 31
See application file for complete search history.

(56) References Cited

U.S. PATENT DOCUMENTS

| | | | |
|---|---|---|---|
| 5,076,588 A | 12/1991 | Minh | |
| 6,666,765 B2 | 12/2003 | Vancura | |
| 7,485,043 B2 | 2/2009 | Beaulieu et al. | |
| 8,485,893 B2 | 7/2013 | Rowe | |
| 2006/0284378 A1* | 12/2006 | Snow et al. | 273/292 |
| 2007/0129149 A1 | 6/2007 | Walker et al. | |
| 2007/0167219 A1 | 7/2007 | Groz | |
| 2008/0207295 A1* | 8/2008 | Yoseloff et al. | 463/13 |
| 2013/0095902 A1* | 4/2013 | Smith et al. | 463/11 |
| 2013/0281176 A1 | 10/2013 | Rowe | |
| 2014/0038680 A1* | 2/2014 | Pececnik et al. | 463/13 |
| 2014/0077457 A1* | 3/2014 | Snow | 273/292 |

OTHER PUBLICATIONS

"Prisoner's Dilemma," Stanford Encyclopedia of Philosophy http://plato.stanford.edu/entries/prisoner-dilemma/, Sep. 4, 1997.
Johanson, "Robust Strategies and Counter-Strategies: Building a Champion Level Computer Player,"Thesis, 2007, University of Alberta.
U.S. Office Action dated Sep. 6, 2011 in U.S. Appl. No. 12/612,976.
"U.S. Appl. No. 13/921,163, Non Final Office Action mailed Dec. 5, 2013", 6 pgs.

* cited by examiner

*Primary Examiner* — Pierre E Elisca
(74) *Attorney, Agent, or Firm* — Kwan & Olynick LLP

(57) ABSTRACT

Apparatus and methods related to multi-player casino games are described. An electronic gaming device is provided that allows a live player to compete against a virtual player in a multi-player wager-based game using playing cards derived from the insertion of a physical denomination of currency. The electronic gaming device can be configured to simulate the decision making of a virtual player and associated behaviors of the virtual player during game play. In some instances, the simulated behaviors of the virtual player output at the electronic gaming device can be learned by a live player so that the live player can make better or more advantageous game play decisions. The simulated behaviors of the virtual player can be conveyed to the live player via visual images, such as simulated facial expressions of the virtual player.

16 Claims, 20 Drawing Sheets

CASINO GAMES

CROSS REFERENCE TO RELATED APPLICATIONS

This patent application claims priority under 35 U.S.C. §119(e) to U.S. Provisional Patent Application Ser. No. 61/436,341, filed Jan. 26, 2011 and entitled "Casino Games" by Rowe, which is incorporated by reference in its entirety for all purposes. This application claims priority under 35 U.S.C. §120 and is a continuation-in-part of U.S. patent application Ser. No. 12/612,976, filed Nov. 5, 2009 and entitled "Casino Games" by Rowe, which is incorporated by reference in its entirety for all purposes.

BACKGROUND OF THE INVENTION

1. Field of the Invention

The described embodiments relate generally to games played on electronic gaming devices. More particularly, the present embodiments relate to multi-player wager-based card games including virtual and live players where a composition of a set of playing cards used in the wager-based card game can vary from game to game.

2. Description of the Related Art

In casino gaming, gaming opportunities are mostly provided via table games and electronic or electro-mechanical gaming devices. In table games, typically one or more players gather around a table and each make wagers on an outcome of game provided by gaming operator, such games include craps, roulette, black jack, pai-gow poker and baccarat. In these games, typically, each player makes a wager on outcome that is just associated with themselves, such as their hand in black jack, their picked number in roulette or their prediction of an outcome in craps. The players participate in the game as a group but play the game individually and not against the other players. Poker is another type of table game where player's play against each other. In a casino that provides poker, the house provides a table, a dealer, chips and scheduling and takes a portion of the winnings. In poker, many players enjoy the aspect of trying to learn a player's behavior to gain an advantage over the other player.

In a casino, other types of games, such as slots and poker, are provided on electronic or electro-mechanical gaming devices. In these games, a player plays the game alone using a player interface provided on the gaming device. The player interface usually includes input buttons and some type of display, such as mechanical display (e.g., slot reels) or a video display, for displaying a generated outcome to the game. During play, the player makes a wager on the outcome of the game, such as a position of slot reels or a value of a poker hand and is rewarded according to a payout table stored on the gaming machine.

In terms of profitability to an operator, electronic gaming devices are much more profitable than table games providing group participation, such as black jack, and table games are much more profitable than group competition games, such as head-to-head poker. This relationship can be seen in the layout of a typical casino where the most floor space, 80-90%, is allocated electronic or electromechanical gaming devices, table game occupy the rest of the floor. Player-vs.-player poker is usually given a separate room off of the main casino floor.

Gaming operators, such as casinos, are always looking for new games that interest players. Currently, gaming devices that provide the player-on-player aspects of group table games, such as poker, with the profitability of slot games do not exist. Thus, it would be beneficial to provide methods and apparatus related to casino games and associated electronic gaming devices that combine the profitability of slot machines with some aspects of player-vs.-player group games.

SUMMARY OF THE DESCRIBED EMBODIMENTS

This paper describes various embodiments that relate to systems, methods, and apparatus for providing multiplayer games. In one aspect, an electronic gaming device is provided that allows a live player to compete against a virtual player or live player in a multi-player wager-based game. In one example, a live player may compete against another virtual player or live player in a card game. The composition of a set cards used in the card game can be varied from game to game. For example, a first card game can be conducted using a set of cards with 6 aces and 4 kings while a second card game can conducted using a set of cards with 4 aces and 6 kings. In a particular embodiment, the composition of a set of playing cards used in the card game can be derived from or affected by information contained on a physical denomination of currency received at a gaming device, such as currency inserted into a bill acceptor.

The electronic gaming device can include a multi-player game engine that does not distinguish between virtual players and live players. The electronic gaming device can be configured to simulate the decision making of a virtual player and associated behaviors of the virtual player during game play. In some instances, the simulated behaviors of the virtual player output at the electronic gaming device can be learned by a live player so that the live player can make better or more advantageous game play decisions. The simulated behaviors can be conveyed to the live player via visual images, such as simulated facial expressions of the virtual player.

One aspect of the invention can comprise a gaming device or gaming system. The gaming device or gaming system can be generally characterized as comprising a game controller, including a processor and a memory, designed or configured to control a play of a wager-based game played by two or more players where the wager-based game is played by at least a live player and a virtual player and where the live player or the virtual player can win the game, 2) receive information indicating a wager on an outcome of the play of the wager-based game from the live player, 3) receive decision information from each of the live player and the virtual player wherein the decision information received by the virtual player affects an amount won or lost by the virtual player; 4) determine the outcome of the wager-based game including determining whether the live player or the virtual player has won and 5) generate a presentation including the play of wager-based game and the determined outcome to the wager-based game.

In a particular embodiment, the gaming device or gaming system can utilize a multiplayer game engine configured to a) progress the wager-based game from an initial position to a final position for each of the live player and the virtual player; b) request the decision information from each of the live player and the virtual player and receive the decision information relating to decisions made by each of the live player and the virtual player.

In other embodiments, a virtual player can be instantiated by the game controller. The virtual player can be configured to make the decisions requested by the multiplayer game engine during the play of the wager-based game. The virtual player can be characterized as comprising, a decision engine configured to make the decisions requested by the multi-player game engine based upon at least a current position of the virtual player in the wager-based game; a behavioral engine configured to determine when to a trigger a behavior of the virtual player wherein the behavior when correctly interpreted by the live player increases the live player's chance of winning the wager-based game played against the virtual player; and a personality engine configured to receive, when the behavior is triggered, information regarding the behavior, determine an action of a virtual character that is generated in response to the behavior; and generate a presentation of the virtual character performing the determined action.

In yet other embodiments, the gaming device or gaming system can comprise a player interface coupled to gaming device configured to allow the live player to input their decisions during the play of the wager-based game and at least one display for outputting the presentation including the play and the determined outcome to the wager-based game and the presentation of the virtual character performing the determined action. The gaming device or gaming system can comprise one or more input devices for receiving cash or indicia of credit used for wagers and one or more output devices for outputting cash or indicia of credit.

One aspect of the invention can comprise a gaming device, gaming system or kiosk incorporating a value acceptor that accepts currency for example $1, $5, $10, $20, $50, and $100 dollar bills. The gaming device, gaming system or kiosk can be generally characterized as comprising a game controller, including a processor and a memory, designed or configured to control a play of a wager-based game played by two or more players where the wager-based game is played by at least a live player and a virtual player and where the live player or the virtual player can win the game, 2) receive information indicating a wager on an outcome of the play of the wager-based game from the live player, 3) receive decision information from each of the live player and the virtual player wherein the decision information received by the virtual player affects an amount won or lost by the virtual player; 4) determine the outcome of the wager-based game including determining whether the live player or the virtual player has won and 5) generate a presentation including the play of wager-based game and the determined outcome to the wager-based game.

The gaming system or kiosk can be configured to construct a set of playing cards to be used in a wager-based game where the composition of the set of cards can be varied from game. In one embodiment, the types of cards used to form a set of playing cards for a game can be selected from among the cards in a standard 52-card playing deck. However, the number of cards and types of the cards in the set used to play a game may differ from a standard 52-card playing deck.

For example, a set of cards used for a game can include 20 cards. The set can include more less than four cards of the same denomination, such as 3 kings or 5 kings. The kings do not necessarily have to follow suit. For instance, 3 kings of hearts or 5 kings of hearts could be utilized in a set.

In a particular embodiment, a gaming device is configured to utilize information included on a value instrument to determine a composition of a playing deck to be used for a card game. For instance, the gaming device, gaming system or kiosk incorporating a value acceptor configured to perform bill validation, additionally performs optical character recognition (OCR) on the bill to read the bill's serial number information and create a sequence of serial number digits readable by a computer. The value acceptor then communicates the sequence of serial number digits to a translator module configured to convert each bill serial number digit into a bill playing card (Bcard) as defined by the translator configuration file. The conversion to Bcards within the translator module creates a plurality of Bcards that are assembled into a plurality of Bcards (aka Bcard deck).

In another aspect of the invention, the Bcard deck is shuffled using a shuffler module based on a configuration file defining how individual Bcards are dealt to the player for a player selected card game such as, for example, randomly dealt to the player, best card dealt to the player, player selected, worst card, high card, low card, or other methods for dealing cards for a particular card game defined by the shuffler module configuration file.

In another aspect of the invention, the shuffled Bcard deck is further used by the player to play a player selected card game, selected from a plurality of card games played with Bcards, wherein each card game uses traditional game logic for the game such as blackjack, five card draw poker, seven card stud poker, war, liar's poker, and other well known card games.

Many card games can involve assembling hands of cards where each hand is assigned a rank. A winner of the game can be determined based upon a rank assigned to each hand. As described herein, in one embodiment a composition of a deck used to play the game can vary based upon a player input, such as based upon via input of their currency into the gaming machine. After a composition of deck is determined, an analyzer mechanism can be configured to determine, for a selected game, possible hands using the deck composition and rank each hand. In one embodiment, a gaming device, for a given deck composition, can be configured to display all or portion of the possible hands and their relative ranking to the player. Further, the gaming device can be configured to display all or a portion of the cards in the deck.

As an example, a first deck composition may include 1 ace and 4 kings while a second deck composition may include 4 aces and 1 king where the aces are ranked higher than a king. In a two-card poker game, a pair can be the highest ranked hand. For the first deck composition with only one ace, the highest possible hand may be a pair of kings while for the second deck composition with 4 aces, the highest possible hand can be a pair. The gaming device can be configured to display information, such as the highest cards in the first deck are 4 aces followed by 1 king and the highest hand or hands for the rules of the game.

In one embodiment, since the relative rank of hands can vary from each instantiation of a game depending on the composition of the deck determined for the game, the gaming device can be configured to provide ranking information to a player including a relative ranking of a player's hand. For instance, in a two card poker game, for a particular deck composition, the gaming device can be configured to display all the possible hands in ranked order and highlight in the order where the player's hand sits in the ranked order. In another embodiment, the computer might display information such as the odds that another live or virtual player has a hand higher than the player.

The ranking information can be calculated independently of the cards dealt to the other player and can be based upon an analysis of the hand dealt to the player and its relative ranking based upon the composition of the deck. For instance, the gaming device can display a percentage of the total possible hands that are ranked higher or lower than the player's hand. The ranking information may be used by a player in wagering decisions associated with the game.

In another aspect of the invention, the player selects one of a plurality of game play options including 1) playing the card game using the Bcard deck against a predefined paytable, 2)

playing the game using the Bcard deck against one or more other players, each of whom uses their own Bcard deck assembled from the serial numbers obtain from bills the player inserted in a value acceptor, 3) playing the game using the Bcard deck against one or more virtual players, each virtual player using its own Bcard deck; wherein each Bcard is randomly drawn from a set of possible Bcards then assembled into a Bcard deck, or 4) playing the game using the Bcard deck against one or more other physical players and virtual players.

In another aspect of the invention, the player is provided with an option to play the Bcard card game upon insertion and validation of a bill into a value acceptor.

In yet another aspect of the invention, the player may 1) play the Bcard card game on the main screen of the gaming machine, kiosk or other display device, 2) play the Bcard card game on a subscreen of a gaming machine, kiosk, or other display device, 3) or play the Bcard card game on a secondary, tertiary, quaternary, quinary, senary, septenary, octonary, nonary, denary, or other available display connected to the gaming machine, kiosk, or other device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF SELECTED EMBODIMENTS

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

Methods and apparatus are described that involve play of multi-player games on electronic gaming devices. In particular embodiments, a live player can play a wager-based multiplayer game against one or more live and virtual players. For instance, a live player can play a wager-based game with a virtual player. Methods for providing a multi-player game on a gaming device including live and virtual players are described. In particular, embodiments are described where a virtual player's behavior is modeled. The modeled behavior can include information related to how the virtual player behaves in certain game situations and strategies the virtual player uses to play the game. The virtual player's modeled behavior can be revealed to a live player over the course of the play of one or more games. In certain game situations, using the information revealed about the virtual player, the live player can gain an advantage in their game play against the virtual player.

Figure 1:
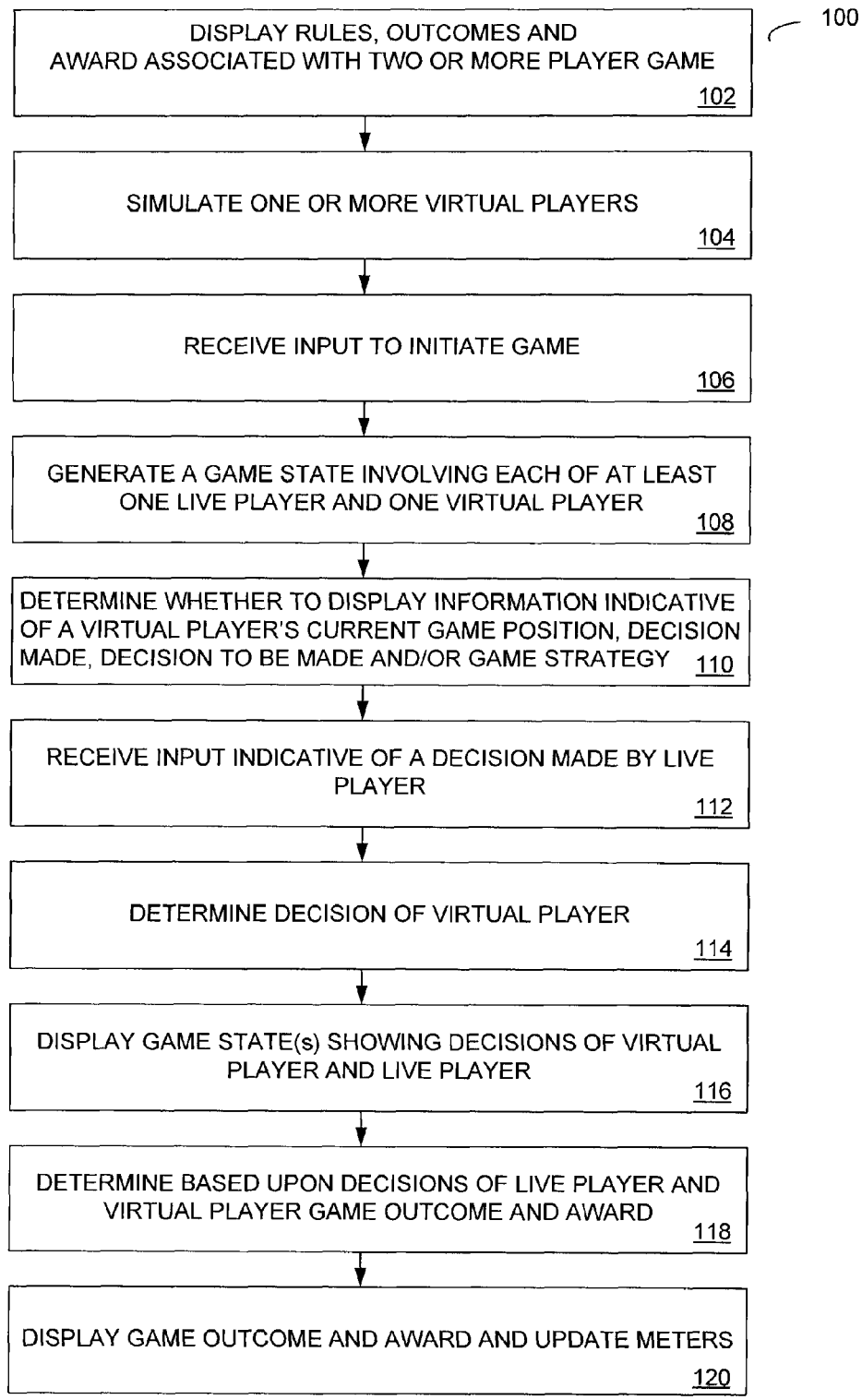
FIG. 1 is a method for providing a game on a gaming device for one embodiment of the present invention.

In FIG. 1, method for providing a multiplayer game on a gaming device including behavioral modeling of a virtual player that can participate in the multiplayer game is described. With respect to FIGS. 2A-2K, aspects of wager-based multi-player games including virtual and live players are described with respect to a play of a card game. With respect to FIG. 3, components of multi-player wager-based gaming system that allows for participation by virtual players are described. With respect to FIGS. 4-6, a gaming system and various gaming devices that can be utilized with the multi-player games including virtual players is described. With respect to FIGS. 7-15, a gaming system and various gaming devices that can be utilized with the multi-player games including virtual players using playing cards created from a bill inserted into a value acceptor (Bcards) is described.

For the sake of clarity, a number of terms are generally described prior to entering into a more detailed description of the methods and apparatus described herein. A progression of the game can be described as including a number of 'positions', such as but not limited to an initial position, a final position and one or more intervening positions. A participant in the game can be referred to as a 'player' such that a player can play a game on the gaming device. The generation of the game on the gaming devices can be described as including a number of game 'states,' such as but not limited to an initial game state, a final game state and one or more intervening game states.

A game position can be associated with a game state and can change from game state to game state but a change in game state does not necessarily require a change in the game position. For example, after a final position in the game is reached in a first game state, in a following game state, an award associated with the final position can be indicated via graphical presentation. Thus, while the game state is advanced, the position of the game remains constant.

In certain instances to advance from a first gaming state to a second gaming state following the first gaming state, the gaming device can require an input indicating a 'decision' by a player. The decision can be related to the progression of the game. For instance, in response to the input, the game can be initiated at its initial position, can change from a first position to a second position or can progress to its final position.

In some embodiments, a decision may not result in a change of position in the game. As an example, in a first game state, a gaming device can receive an input indicating a wager by the player. The gaming device can be configured not to advance to the next game state until an indication of a wager is received. The decision of the player can be described as including whether to wager or not and how much to wager. In a second game state following the first game state, the gaming machine can be configured to receive an input indicating the player wishes to initiate the game. The decision by the player can be described as whether to initiate the game or not. In response to the player decision in the second game state, the gaming machine initiates the game at its initial position. Thus, the position of the game is changed in response to the decision in the second game state but not in response to the decision in the first game state. As another example, after the game is ended in a third game state, i.e., reached its final position, the player can decide to 'cash out.' In response to the receiving an input indicating a desire to cash out, the gaming device can output cash or indicia of credit. Again, the position of the game is not changed in response to the cash-out decision made by the player.

FIG. 1 is a method 100 for providing a game on a gaming device for one embodiment of the present invention. In 102, information relating to rules, outcomes and awards corresponding to outcomes associated with a two or more player game can be displayed on the gaming device. The rules displayed can include but are not limited to 1) how the game is played, such as what positions occur during a game and how the game progresses, 2) what decisions a player can make during a game and in particular, how their decisions affect positions in the game and possible awards and 3) how the game starts, progresses and end.

The outcomes displayed can include but are not limited 1) how an outcome is defined, 2) when it occurs during the game and 3) relative rankings of outcomes. For example for a slot game, the outcomes can be defined as a combination of symbols appearing along a payline after the reels stop spinning Thus, information showing or describing various combinations of symbols can be displayed. As another example, for a card game, the outcomes can be defined as a single card or a combination of cards where certain cards or combinations are cards are ranked higher than other cards or combinations of cards. Thus, information regarding various card combinations and their relative rankings can be displayed. As another example, for a dice game involving a roll or rolls of a pair of six-sided die, the outcomes can be defined as one or both of a total amount indicated by the dice and/or combinations of symbols appearing on each die. Thus, information regarding the totals and combinations of symbols can be displayed.

In various embodiments, an award can be associated with the outcome of the game. In 102, information about what awards are associated with what outcomes can be displayed. Awards of varying amounts can be tied to particular outcomes. For instance, in a casino environment, a cash award or indicia of credit redeemable for cash can be associated with the outcome to a slot game, i.e., what combination of symbols appear in a final position of the game. In another example, each player can be required to make a wager prior to initializing a game, after playing the game an outcome can be associated with each player where some outcomes are ranked higher than other outcomes. When one player achieves an outcome that is higher than the outcome of the other player, the award for the winning player is that they keep the wager of the other player. In other embodiments, a monetary award may not be associated with a winning outcome and a player can just receive and indication that they were victorious over the other player based upon the outcomes achieved by each player.

Returning to FIG. 1, in 104, one or more players in the game can be and their game play strategy can be simulated. Simulated players can be referred to as virtual players. To simulate a player, the gaming device can be configured to determine decisions required by the virtual player during game play that affect the position of the game and its outcome. The gaming device can determine the required decisions by executing various algorithms, strategies and methods encoded as executable logic on the gaming device. In particular embodiments, game strategies can be developed by applying the principles of game theory which is described in more detail with respect to FIG. 3.

In particular embodiments, the virtual player can be configured to win a game against a live player or a combination of live and virtual players. The virtual player can be configured to respond to a common set of decisions that each player, whether virtual or live, is expected to make during play of the game. The virtual player can be configured to make decisions that affect an amount won or lost by the virtual player. For instance, a gaming operator can provide the virtual player cash or indicia of credit to be used against a live player in a game in which the live player and the virtual player participate. The virtual player can be considered as acting as an agent of the gaming operator. The virtual player can make decisions that result in cash or indicia of credit being won by the virtual player. Thus, as a result, cash or indicia of credit can be transferred from the live player to the virtual player where the virtual player's winnings are received by the gaming operator. Conversely, losses by the virtual player can result in cash or indicia of credit being transferred from the gaming operator to the live player where the virtual player's losses are received by the live player.

In particular embodiments, some games played on the gaming device can require at least one virtual player. For instance, a two player game can involve one live player and virtual player. As another example, a three player game can involve two live players and one virtual player or one live player and two virtual players. In yet another example, a four player game can involve two pairs of players where each pair of players includes a live player and a virtual player or a six player game can involve three pairs of player where each includes a live player or two groups of three players where each group includes one or two live players and the rest virtual players. In yet other examples, pairs of live players could be pitted against pairs of live and virtual players and pairs of virtual players. Many such combinations are possible and are not limited to the examples described above.

In 106, the gaming device can receive an input to initiate game. For instance, in a two player game involving a live player and a virtual player. The gaming device can be configured to receive an input via an input mechanism that indicates the live player desires to initiate the game and in response initiate the game. In some embodiments, an input to initiate the game may not be necessary. For instance, in a group game, a game server can be configured to provide an enrollment period for a game on a number of gaming devices where during the enrollment period various players can be enrolled in a game. After the enrollment period has ended, the game server can initiate on each of the gaming devices enrolled in the game. As another example, the decision to initiate the game can be combined with another decision by the live player. For instance, a gaming device can be configured to receive an input indicating a wager amount, which is also interpreted by the gaming device as a decision by the player to initiate the game.

In 108, a game state can be generated. The game state can include a position in the game determined for each player by the gaming device. In a particular embodiment, the game state can include a position in the game that is determined for at least one virtual player and one live player. For instance, in a card game involving a single card dealt to each player in a two player game, the gaming device can be configured to randomly determine a card for each of the virtual player and a live player from among a deck of cards. Next, as will be described in more detail with respect to FIG. 2A-2H, the gaming device can be configured to output information about the current position in the game. For instance, in the card game involving the single card, the gaming device can be configured to display the single card dealt to the live player.

In 110, the gaming device can be configured to determine whether output information indicative of a virtual player's 'behavior' during game play. When detected and correctly interpreted by a live player utilizing the gaming device, the behavioral information can be used by the live player to gain some advantage in playing their current game or playing a future game with the virtual player. In particular embodiments, the gaming device can communicate the behavioral information by generating a model of the virtual player that simulates their appearance and behaviors. The behavioral information can relate to but is not limited to information regarding 1) the virtual player's current game position, 2) how the virtual player behaves before they have made a particular decision, 3) how the virtual player behaves after making a particular decision, and/or 4) a strategy or strategies that the virtual player employs during their game play, such as a decision making strategy that can vary from situation to situation (e.g., it can change as a function of game position).

As an example, in one embodiment, a model of the virtual player's face may be generated after the game is initiated in 106. The virtual player's face can be generated with general features, such as long or short hair, tough or nice looking, male or female. The general features can be associated with or unrelated to the virtual player's style of playing the game, i.e., strategies that the virtual player tends to use. Initially, the virtual player's face can be rendered with an expression that can be interpreted as neutral, i.e., neither happy or sad. Then, after an initial game position is determined for the virtual player if it is determined that behavioral information is to be displayed, the virtual player's appearance can be rendered with an alternate expression that is indicative of their game position. For instance, if the virtual player's initial game position is determined to be good, then the gaming device can be configured to change the player's expression from neutral to happy. If the virtual player's initial position is determined to be bad, then the gaming device can be configured to change the player's expression from neutral to sad.

The rendered images showing the behavior change of virtual player can be static or dynamic and can be of a temporary nature. For example, the virtual player's expression can be shown in an animated manner to change from neutral to happy over some time period. Then, the virtual player's expression could return back to a neutral expression over some time period and then remain with a neutral expression. More details of modeling virtual player's appearance and associated behavior and under what conditions the gaming device outputs this information are discussed with respect to FIG. 2A-2K.

The gaming device can be configured to repeat an output of the virtual game player's behavioral information in response to an event that occurs during the play of the game, such as but not limited to in response to an occurrence of a particular game position. Also, an output of a particular behavior of the virtual player can be linked to a particular game position or a group of related game positions. For instance, in a card game, the gaming device can be configured to output a particular behavior of the virtual player only when the virtual player is dealt a particular card, such as the queen of hearts and can be configured to output a another behavior of the virtual player when the player has been any card less than or equal to 5. In this example, a first event comprises the virtual player receiving a particular card and a second event comprises the virtual player receiving a card with a value less than five. As noted below, other factor can also be used to determine whether an event leading to an output of behavior information has occurred. In particular embodiments, the gaming device can be configured not to output associated behavioral information every time an event occurs but only part of the time. For instance, in the card game, when the player is dealt of queen of hearts, the gaming device can be configured to output behavior information associated with this card 80% of the time where the determination is based upon a randomly generated number.

In general, an event that triggers an output of behavioral information can be associated with many different factors and is not limited to a current game position. For instance, the event could depend on the one or more of 1) a current game position of the virtual player, 2) a past game position, 3) whether the virtual player is on winning streak or a losing streak, 4) the time of the day, day of the week, etc., 5) a wager amount made by the live player, 6) a current game state, such as a game state requiring the virtual player to make a decision, 7) random factors and combinations thereof. As an example, at random times during game play the information about the virtual player's behavior can be output, such as "The virtual player blushes when they are bluffing."

The gaming device can be configured to repeat the behavior information often enough in response to game events such that a pattern of the virtual game player's behavior in certain game situations, such as in response to particular game positions, can be determined by a live player. Also, the gaming device can be configured to directly reveal or provide hints about certain patterns of virtual player behavior, such as the virtual player is likely to tap their foot a lot or fidget, when their game position is poor. For this implementation, the gaming device can be configured to determine whether a game position is poor relative to other game positions and hence trigger the output of virtual player behavior information.

The game played on the gaming device can be constructed to include game situations for the live player where a decision is to be made. In some of these game situations, that are generated, the behavioral information about the virtual player may help the live player make a better decision. As an example, the gaming device can be configured to provide a poker game between a live player and a virtual player. The gaming device can be configured such that in certain situations the virtual player bluffs. When the virtual player is bluffing, the virtual player's appearance that is rendered by the gaming device can be modified to indicate when they are bluffing. For instance, the virtual player can be rendered dynamically, such that blinking of the virtual player is rendered. When the virtual player is bluffing, its blink rate can be increased. Thus, in a situation where the live player has to make decision as to whether to call a bluff of the virtual player, if the live player recognizes that the virtual player's blink rate is increased then, the live player can use this behavioral information in determining whether to call the virtual player's bluff.

In 112, the gaming device can receive an input indicative of a decision made by a live player. For example, using the example from the previous paragraph, the player can make a determination of whether the virtual player is bluffing or not and then the gaming device can receive an input indicating the live player wishes to bet or fold. In 114, the gaming device can be configured to make decisions required of the virtual player. For example, in a card game, the virtual player can be required to make a bet or fold. The decision made for the virtual player could be based upon a probabilistic determination of their odds of winning the game. These decisions can vary from game to game. Some methods determining decisions of a virtual player are described in more detail with respect to FIGS. 2A-2K and 3.

In 116, gaming device can be configured to output various game states. The game states can include but are not limited to visual and/or auditory output that indicate information about game positions and decisions made by each of the virtual and live players as the game progresses. In 118, at the end of the game, based upon each of the player's final game position and/or decisions made by each of the live and virtual players, a game outcome can be determined. In some embodiments, the game outcome may be that one of the virtual or the live player is victorious, which determines whether the live player receives an award. In other embodiments, depending on how the live player played the game, an initial wager, a final position of the live player in the game, which can vary from game to game and combinations thereof. An award associated with the outcome of the game for the live player can be determined. In 120, the gaming device can be configured to output a game outcome and its associated award. In the case of a casino type gaming machine, the gaming device can be configured to update meters and credit information.

In FIGS. 2A-2K an example of a card game incorporating details of the method discussed with respect to FIG. 1 is described. The card game used in the example is a game of 'war.' In the game of war, each of two or more players can be provided a hand consisting of 1 or more cards from a deck of cards, such as a standard deck of card. A rank can be assigned to each hand. The hand with the highest rank can be considered the winner and hands of equal rank can be considered as a tie. In the following example, the card deck consists of 52 cards comprising 4 suits of 13 cards each with symbols in each suit from lowest to highest of 2, 3, 4, 5, 6, 7, 8, 9, 10, Jack, Queen, King and Ace.

In the example, each hand comprises one card where no preference is given to suit. Thus, the highest ranked hand consists of an Ace and lowest ranked hand consists of a 2. These rules described in this paragraph and the previous paragraph can be displayed on or by the gaming device. Many different card games as well as other types of games can be utilized and the present invention is not limited to the following examples which are provided for the purposes of illustration.

Figure 2A:
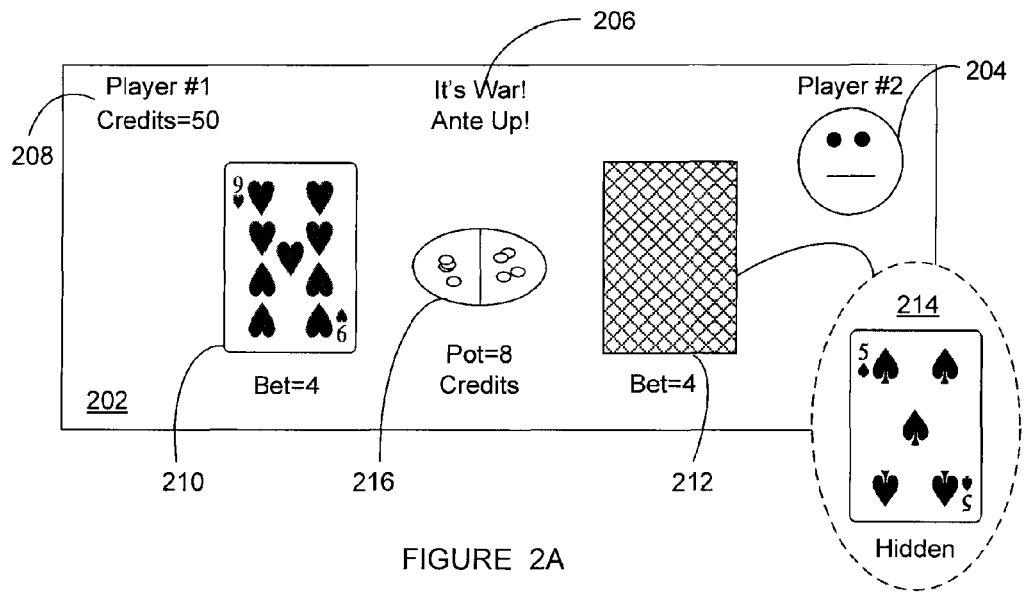
FIGS. 2A-2K illustrate aspects of wager-based multi-player games including virtual and live players for embodiments of the present invention.

In FIG. 2A an image 202 including an initial position of the war card game is illustrated. The image can be output to a display device associated with an electronic gaming device. Two players, 1 and 2, are participating in the game. Player one is a live player and player 2 is a virtual player. Player 1 starts with 50 credits. The number of credits, such as 208, available to each player can be incorporated into the image 202. The second player, i.e., the virtual player, is banked by the house. Thus, the house money can be won or lost based upon the game playing decisions of the virtual player. The house can be a gaming operator such as a casino. The amount of credits assigned to player 2 is not shown but some arbitrary amount could be assigned to player 2 if desired.

To start the game, each player provides an initial bet, which is referred as an ante. The image 202 includes a message, 'It's War, Ante up,' which provides an indication that each player is required to provide an input indicating an ante amount. 'It's War, Ante up' is an example of a status message that can be generated to during the play of the game to indicate decisions that can be needed during a current position of the game.

In one embodiment, the live player can be provided the option of anteing up between some minimum and maximum value to start the game which is matched by the virtual player 2. In this example, player 1 is shown as anteing 4 credits (each credit can be redeemable for some cash amount or an actual cash amount could be used). Player 2 is shown as matching the ante of player 1. The combined contributions of each player are shown as a 'pot' with a value of 8 credits. The pot is represented as an oval table that is divided in half where the amount contributed by each player is shown on each side of the divide.

In the initial position of the game, player 1 is dealt a card, 210, which is a 9 of hearts and player 2 is dealt a card, 212, which is a 5 of spades. In image 202, the card 212 of player 2 is shown as hidden to player 1. In a multiplayer game involving two or more live players, it can be necessary to generate multiple images where the information shown to each live player can vary from player to player. For instance, a first live player can be shown their hand while the other players including one or more live player's hands remain hidden and then a second live player can be shown their hand while the other first player and the other player's hands are hidden. The images for the first and second player that comprise different hidden information could be displayed on separate display devices that are not visible to both the first player and the second player at the same time such as located on gaming devices in different locations.

An image 204 representative of virtual player 2's behavior can be provided. As described with respect to FIG. 1, the behavioral information can relate to but is not limited to information regarding 1) the virtual player's current game position, 2) how the virtual player behaves before they have made a particular decision, 3) how the virtual player behaves after making a particular decision, and/or 4) a strategy or strategies that the virtual player employs during their game play, such as a decision making strategy that can vary from situation to situation (e.g., it can change as a function of game position). In one embodiment, the behavioral information can be conveyed via a face. The face can be drawn to convey a facial expression. The facial expression can be representative of a particular emotion. In 202, a simple face is shown that is drawn with a neutral expression. The neutral expression is represented by the mouth which is a straight line.

A virtual behavior can be represented by a character associated with the virtual player. Many types of emotions can be represented by the characters described herein. Some positive emotions can be represented include but are not limited to Adequate, Awe, Assured, Able, Capable, Certain, Charmed, Cheerful, Comfortable Compassion, Courageous, Confidence, Determined, Delighted, Eager, Energetic, Enthusiastic, Excited, Exhilarated, Expectant, Elation, Empathy, Excellent, Fascinated, Glad, Good, Great, Grateful, Glorious, Glamorous, Graceful, Happy, Hopeful, Humorous, Inspired, Interested, Joyful, Magnificent, Lust, Love, Pleasure Playfulness, Peaceful, Pleasant, Powerful, Pride, Positive, Relaxed, Relieved, Satisfied, Surprised, Sympathy, Stable, Sublime, Superior and Thrilled. Some negative emotions that can be represented include but are not limited to Annoyed, Anxious, Apprehensive, Agonize, Anger, Anxiety, Apathy, Bored, Burdened, Cautious, Competitive, Concerned, Confused, Contempt, Depressed, Destructive, Disgusted, Distracted, Doubtful, Disappointed, Exasperated, Exhausted, Embarrassment, Envy, Frustrated, Fear, Guilty, Greed, Grief, Harassed, Hesitant, Hostile, Ignored, Impatient, Indifferent, Intimidated, Isolated, Irritated, Jealous, Jumpy, Lonely, Mad, Manipulated, Miserable, Obnoxious, Overwhelmed, Panic, Pressured, Remorse, Revenge, Shame, Sad, Scared, Shocked, Suspicious, Stress, Tired, Uncomfortable, Uneasy, Used, Wary, Weary and Wasteful. These emotions can be conveyed using a combination of facial expressions and body movements for instance a nervous player could smile and tap their fingers or foot or a nervous player could smile and twirl their hair in certain situations.

In various embodiments, the face can a complex 2-D or 3-D rendering. The face can be representative of a human or non-human character and include all of the features associated a face, such as but not limited to eyes, eye lids, pupils, eyebrows, lips, nose, hair, moles, ears, wrinkles, nostrils, teeth, skin blemishes, skin coloration, jewelry, glasses and combinations thereof. Further, besides a face, all or portion of a body, associated with the face can be rendered, such as a neck, hands, feet, limbs, torso. The body can be clothed and include other adornments.

The amount of the body rendered can be varied from time to time. For instance, at one time, a player's face and neck can be shown and then during another time a hand can be shown entering the picture and performing an action, such as scratching a nose, twirling hair or pulling a lip, and then shown leaving the image. As another example, a face could be shown and then the image could switch to a rendering of the entire player's body, the virtual player could be shown performing a dance or some other action. Details of facial modeling and body modeling that can be utilized in the present invention are described in "Facial Modeling and Animation Done Right," Second edition, by Jason Osipa, Wiley Publishing, Inc. Indianapolis, Ind., 2007, ISBN -13:978-0-471-79820-8, and "Body Language: Advanced 3D Character Rigging," Eric Allen and Kelly L. Murdoch, Wiley Publishing, Inc. Indianapolis, Ind., 2008, ISBN 978-0-4-17387-9, each of which is incorporated by reference in its entirety and for all purposes. A computer program that can be used to generate 2 and 3-D character animations or still images that can be used in the embodiments herein is "Autodesk Maya," provided by Autodesk, Inc., San Rafael, Calif.

In other embodiments, images of an actual person can be employed. These images can comprise movie clips and/or still images of an actual person. The actual person can be performing various actions and/or modeling various facial expressions. The movie clips can be played at different times during the game to reveal different behavioral information about the player. In yet other embodiments, images that include behavioral information do not even have to include a human or non-human character. For instance, various symbols such as clouds, sun, rain, rainbows and lightning could be used to characterize various game positions and decision making strategies of the virtual player.

In the embodiments described herein, the image 204 is not limited to visual components. Information can be conveyed via other sensory modes, such as via an audio mode. For instance, a human or non-human character could be shown speaking, such as conveying words represented of disgust at a bad position in game, such as a bad hand or happiness at a good position in the game or the opposite, i.e., the human or non-human character could express happiness sometimes when they are in a bad position in the game and happiness when they are bad position. Also, visual and audio components can be combined.

Figure 2B:
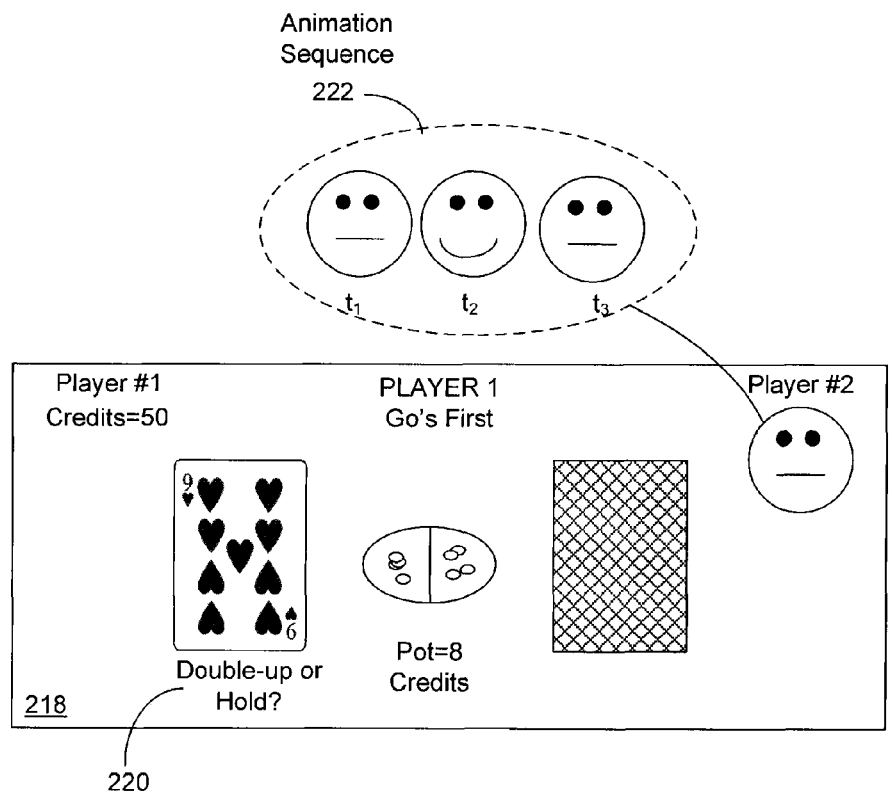

FIG. 2B is an image 218 of the card game shown in FIG. 2A after the initial position. In this example, each player takes turns making their decisions. But, as indicated in the FIG. 2B, player is to go first. In a series of games or a single game comprising multiple rounds, the players 1 and 2 could alternate in regards to who is required to go first. In an initial game, such as after, the live player first deposits credits on the electronic gaming device, in a turn-based game, the player going first can be selected at random by the gaming device and then alternate between the one or more other virtual and live players during subsequent games or rounds.

In the position shown in FIG. 2B, player 1 is offered the decision 220 to double their bet or hold. If player 1 doubles their bet, then player 2 can be required to match their bet or fold. While player 1 is offered the decision 220, the gaming device can determine that a behavior of player 2 is triggered. The behavior can be triggered based upon a number of factors as previously described, such as but not limited to player 2's current game position. In 222, the behavior is conveyed as a sequence of images showing the player 2's facial expression changing with time. The player facial image changes from a neutral expression to a smile and then back to a neutral expression. The image 218 could be redrawn over time to show player 2's facial expression changing as indicated in the animation 222.

While player 1 is making their decision, in various embodiments, the animation could be played once or repeated at intervals such as random intervals. The animation shows only expressions at three times but intervening expressions can be drawn such that the player's expression appears to transition in a continuous manner from one expression to another expression. The behavior does not have to be conveyed as a single expression. For instance, the face could be shown transitioning between happiness and sadness. The expression rendered does not have to return to its initial state as shown but could be animated changed from one expression to another. Further, behavior does not have to be provided as an animation sequence. Instead, a first image of the neutral image could be shown followed a second image of a smiling face.

If the animation sequence 222 that conveys player 2's behavior corresponds to a game position of player 2 and if player 1 has learned the relationship between the behavior and the game position, player 1 can gain an advantage in their decision making process. For instance, if animation sequence 222 were repeated each time or some percentage of the time when player 2 had a five or less, then player 1 would know in this instance to double up their bet because player 2 has a worse hand than player 1. If player 1 did not know of this behavior, player 1 could observe this behavior and then later on see what card is in player 2's hand. Then, the player 1 could see if this behavior is repeated again and under what circumstances to see if a pattern is established.

A single behavior that is conveyed in the animation sequence 222 can be provided for multiple game positions. For instance, as described above in the previous paragraph, the behavior triggered each time or some fraction of the time when the virtual game player's position is any hand of 5 or less. In another example, the same behavior could be triggered each time the player had a 5 or less or an ace. In this example, if player 1 knew this behavior was triggered, then they would know that they could still lose (player 2 possesses an ace) or could win (player 2 posses a 5 or less) and make a decision based upon this information. In general, a behavior can be linked to a single game position or multiple game positions and is not limited to these examples. In the instance of the multiple game positions, the positions can be of a similar rank, such as a range of good positions, bad positions, mediocre positions or combinations thereof.

Figure 2C:
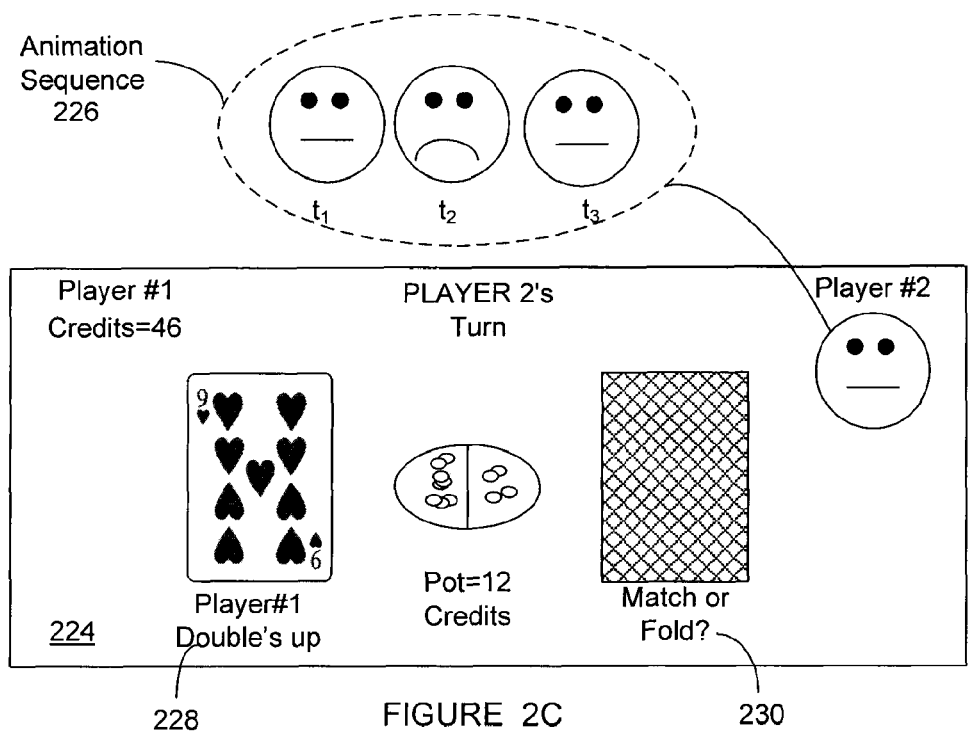

FIG. 2C illustrates an image 224 a game position where player #1 has made a decision to double their bet. For example, image 224 could follow from image 218 in FIG. 2B. Relative to image 218, after the bet, player 1's credit is shown reduced and the pot size is shown increased to 12 credits where player 1 has more credits on the table than player 2. Player 1's position is shown as having doubled up 228. The image 224 indicates that it is player 2's turn to make a decision. The decision is to match player 1's bet or fold 230. The fold decision allows a player to opt of the game independent of their game position. For the virtual player, the decision can be determined by a decision engine executed on the electronic gaming device. (Decision engines are also described with respect to FIG. 3).

In general, virtual player 2 will not have any more knowledge in making a decision than live player 1 posses. For instance, the decision for the virtual player 2 can be made with the knowledge that player 1 has doubled their bet and that the current card that player 2 is holding is a 5 of spades. Thus, even though player 1's card is shown in the figure, the decision engine is not allowed to use it to determine their decision. Based on the knowledge of their current game position and that player 1 has doubled their bet (i.e., a decision made by player 1), a decision engine can determine for the virtual player 2 whether to match player 1's bet or fold. Thus, a decision engine can make decisions based upon decisions made by other players, a current game position or combinations thereof.

In some embodiments, a game theory analysis of the game can be used to construct a decision engine. The game theory analysis can be used to determine an optimum decision in each instance of a game position based on certain assumptions of the live player's behavior. For instant, using game theory, a decision tree can be constructed based upon all possible game positions that player 1 could possess relative to player 2 and decisions that player 2 could make in response, to determine a decision that is likely to produce the best outcome for player 2.

In some embodiments, the virtual player can possess less knowledge than the live player because the virtual player decisions can be generated without knowledge of player 1's past play and behaviors while the live player can be afforded the opportunity to learn about the virtual player's behavior related to playing the game. For instance, as noted above, the decision engine can be configured to use only information about the current game position and/or decisions player 1 has made in the current game. In other embodiments, a decision engine for the virtual player can be configured to analyze past game play patterns of an individual player or a group of players including decisions made in response to particular game positions. This information can be used by the decision engine to change their strategy in real time. For instance, the live player could play a number of games against the virtual player and an analysis could be performed to determine if the live player exhibits any particular behaviors in particular game positions and then a configuration of the virtual player's decision engine can be adjusted to take advantage of the live player's behavioral pattern or a group of player's behavioral pattern. This type of decision engine can be referred to as an adaptive decision engine. Also, in other embodiments, past player decisions can be saved to validate a decision engine for a virtual player where it is an adaptive engine or not.

Returning to FIG. 2C, prior to an indication in the image of player 2's decision being displayed in 224, an animation 226 can be generated. The actual computer time to make a decision can be quite fast but the gaming device can be configured to wait a certain time period before indicating a decision of the virtual player to simulate the virtual player taking time to make their decision and behaving a certain way during the decision process. In other embodiments, for a more complicated game, the wait time can also be used to allow the gaming device to perform its calculations. Prior to deployment, a decision engine can be tested on various hardware platforms to determine that a wait time in any possible game position does not exceed some desired maximum limit.

The animation 226 can be used to convey some information related to a behavior associated with the decision. As previously discussed, the decision can be a function of the virtual player's current position, decision made in the current game by the virtual player and live players and in some embodiments, past decisions made by live players. Since animation 226 is played after player 1 has indicated their decision, the animation does not convey information that can influence this prior decision. In some embodiments, animations indicative of a triggered behavior can occur after a live player has no more decisions left to make in a game. Nevertheless, the behavioral information that is conveyed, if properly interpreted by the live player, could be used to indicate information that is useful in future game decisions that the live player could make against the virtual player.

As an example, in the animation sequence 226, the virtual player 2 can be shown making a sad expression during their decision to match or fold. In a future game, the virtual player could be shown making the same expression when they have to make a decision to double up or not when they are in a similar game position. In the future game, knowing this information, the live player may be able to use this information in their decision as to whether to match a double by the virtual player. Thus, in various embodiments, behavioral information that is conveyed can be useful for making a current game decision or a future game decision.

It various embodiments, a gaming device can offer multiple virtual characters that present a virtual player's game playing behavior. The multiple virtual characters can present different behaviors from one another. The virtual characters can be generated with a recognizable appearance such that the live player will know in the future that they are playing against the 'same' virtual player, i.e., makes decisions in the same way and repeats their behavior patterns. Thus, the live player can continue to learn and apply knowledge about a particular virtual character over the course of many game play sessions which can involve separate visits to the same or different gaming establishments.

Figure 2D:
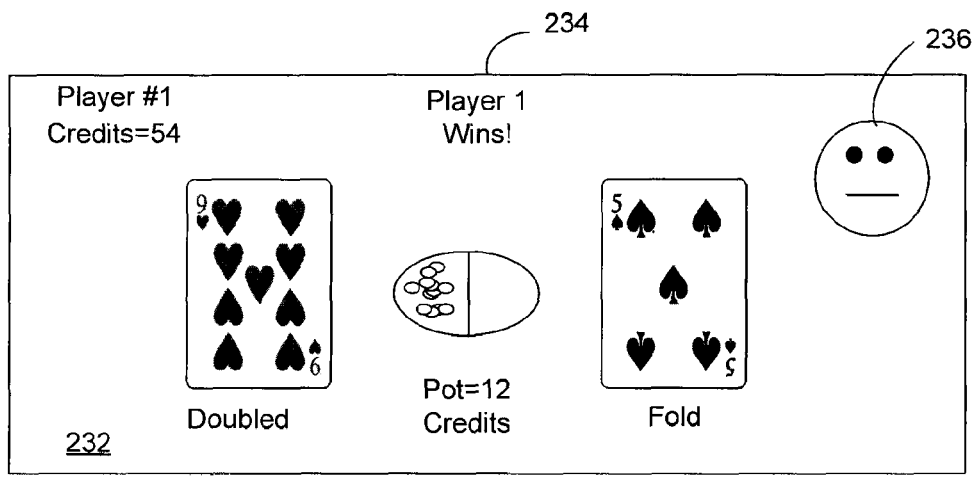

FIG. 2D is an illustration of a card game, such as War, in a final position. Image 232 could be shown after image 224 in FIG. 2C. Virtual player 2 is shown as having folded. In this embodiment, the card virtual player 2 had is revealed. In some embodiments, the virtual player's game position at the end of the game may not always be revealed. For instance, the virtual player's hand can be shown when they decide to match or double a bet but not when they fold. Whether a virtual player's game position is revealed or not in each game can determine whether or not a live player is able to associate the virtual player's behavior with a virtual player's game position.

The virtual player's game position does not have to remain hidden and then revealed at only certain times in a game according to the rules, such as at the end of the game. In some embodiments, the revealing of the virtual player's game position could be triggered according to various conditions, such as at random and under circumstances where it is not normally revealed. For instance, relative to FIGS. 2A-2C, a revealing of the virtual player's game position could be rendered as the virtual player's card being revealed and then being hidden again as is shown in these figures. If the game position of the virtual player is revealed proximate to when a behavior of the virtual player has been conveyed, it could provide an opportunity for the live player to associate a game position with information conveyed about the virtual player's behavior.

Returning to FIG. 2D, the outcome of the game is indicated in 234 as Player 1 wins. Relative to FIG. 2C, an adjustment in player 1's credit is shown as increasing where the live player has won 4 credits from the virtual player. To indicate the outcome all of the credits are shown on Player 1's side of the table. This depiction is in addition to the displayed message that player 1 has won. In some embodiments, player 1 may not receive all of player 2's credits when the win, such as the 4 credits shown in FIG. 2D. For example, the gaming device can be configured to take a percentage of each win by a live player, such as 10%. This take could provide a profit margin for the casino.

The moving of player 2's credits to player one side could be shown in animated manner as could the outcome in general. For instance, virtual player 2 could be shown throwing their card down in disgust when they lose or could be shown taunting when they win. These types of behaviors could be part of the 'personality' developed for the virtual character.

Various rules can be constructed to allow the casino to make a profit on the game while providing a live player a chance of winning money. For instance, the rules of the game, associated awards for outcomes and a decision engine can be constructed such that the casino will win over time even if the live player makes optimal decisions every time. Traditional, slot games and video poker games are set up in this manner Nevertheless, due to random factors introduced into the game, such as that each player's position is determined by a random draw of a card, the live player can be expected to win at least some portion of the time. Further, by learning about the virtual player's behavior, the live player can be afforded the opportunity to increase their likely payback percentage over time and increase their chances of winning.

Figure 2E:
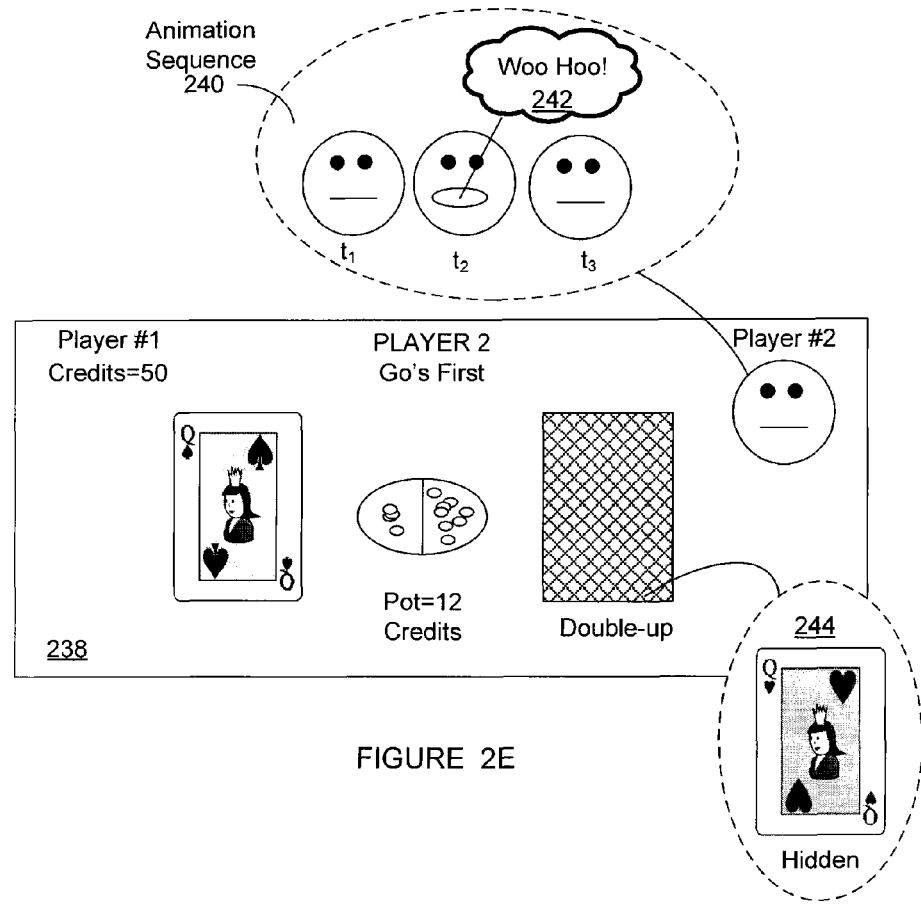

FIG. 2E shows a game position of the game described with respect to FIGS. 2A-2D where the virtual player goes first. This game position could be generated before the example described in FIGS. 2A-2D or could be generated after. In FIG. 2E, each player has been provided an initial game position where each player has anteed four credits, the virtual player has been offered the decision to double up or not and decided to double their bet.

An animation sequence 240 is shown for the virtual player, the animation shows the virtual player as saying 'woo hoo.' The statement could be conveyed as text in the animation, a sound emitted by the gaming device or combinations thereof. The face of the virtual player can be rendered and sounds emitted from the gaming device so that it appears the virtual player is actually speaking the word in a particular language. Virtual characters can be rendered to lip sync speech in various languages depending on where a gaming device is to be used and the gaming device can be configured to output written text or audio accordingly.

The animation 240 of the behavior of the virtual player including text or audio components can be triggered as a result of their game position. For instance, in this example, the game position 244 of the virtual player is a queen of hearts. The animation could be used to convey that the virtual player is happy with their current game position. The animation could be shown after the initial position of each player is shown and prior to an indication that player 2 has to be make a decision, while the virtual player 2 is making their decision or combinations thereof.

Figure 2F:
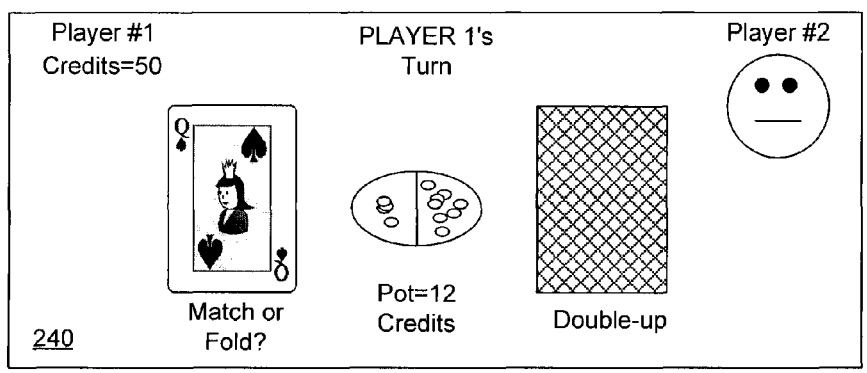

FIG. 2F illustrates an image 240 a game position where the live player is required to make a decision whether to match or fold. This game position could be rendered after the example shown in FIG. 2E. The live player is required to make a decision as to whether to provide an additional four credits. The player can base their decision on information about their game position, the decision made by the virtual player, i.e., the virtual player has doubled-up (the player may assume the virtual player has doubled-up because they have a good hand or may assume the virtual player is bluffing), and any information revealed about the virtual player, such as in the animation sequence described with respect to FIG. 2E or from the play against the virtual player in previous games.

As previously described, the gaming device can be configured such that a behavior of the virtual player is not conveyed every time the virtual player is in a particular game position. Also, a behavior conveyed for the virtual player does not even have to relate to a game position. For instance, certain behaviors of the virtual player can be conveyed at random that are just part of the virtual player's personality. Further, even when the virtual player behavior that is currently being conveyed or has been conveyed is related to a current game position, the live player has to correctly interpret the information. Thus, the live player's decision can based upon all or a combination of these factors, i.e., their game position, decisions made by the virtual player, whether a behavior of the virtual player has been conveyed and if so whether it is related to a current game position of the virtual player.

Figure 2G:
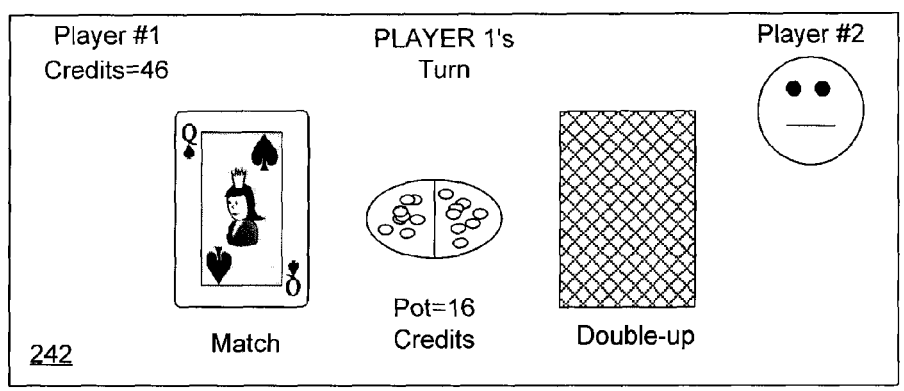
Figure 2H:
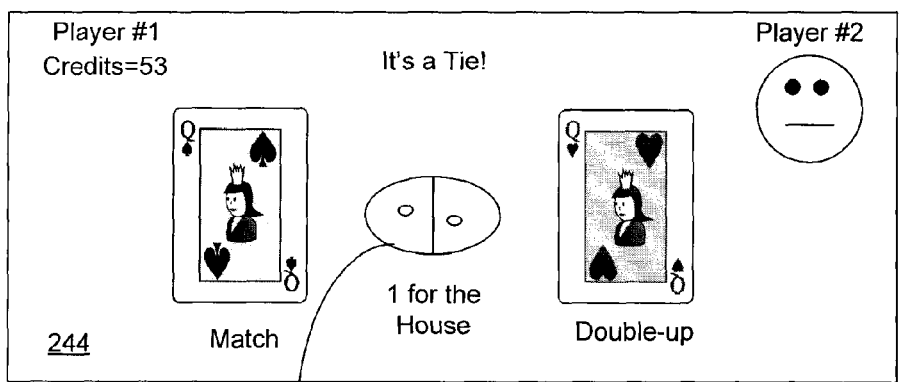

FIGS. 2G and 2H show images, 242 and 244, comprising game positions where a live player has matched a bet of a virtual player and then a presentation of the outcome is shown. FIGS. 2G and 2H could be rendered after the image 240 shown in FIG. 2F. In FIG. 2F, the live player is illustrated as matching the bet of the virtual player. The pot size is shown as being 16 credits. In FIG. 2H, the image 244 shows the outcome which is a tie. All of the credits are being shown returned to each player except for one credit for each player being left on the table. In the image, it is indicated that 1 for the house is an amount that is not credited back to the live player. Not returning all of a live player's money for game outcomes that are inconclusive, i.e., a tie in this instance is one method of constructing a game that is profitable to a casino. Another example, as previously described, is taking percentage of the live player's winnings.

The gaming device can be configured to show virtual players and a live players being treated the same. For instance, a percentage of a virtual player's winning could be shown going towards the house in a win and a percentage of the virtual player's money could be shown going toward the house even in instances where the house is banking the virtual behavior. In some embodiments, it can be possible for the live player to select a virtual player to play against another virtual player or another live player. The live player could be afforded the opportunity to override decisions of the virtual player they have selected if desired but the live player acts a bank and backs the virtual player. Thus, it can be advantageous to treat live players and virtual players identically because the live player can be offered the opportunity to play themselves or select a virtual player to act as their agent.

Figure 2I:
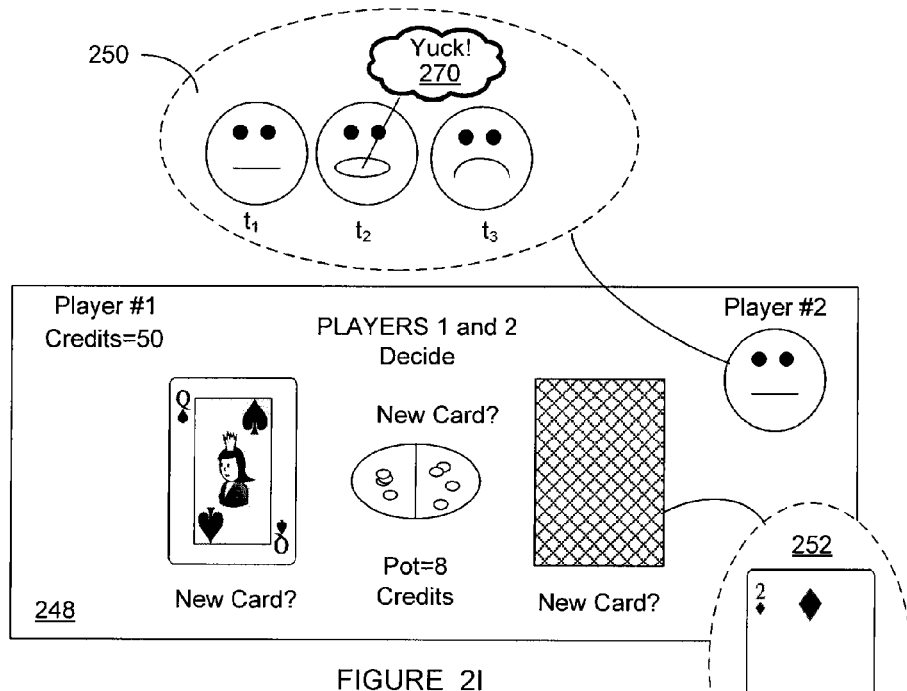
Figure 2J:
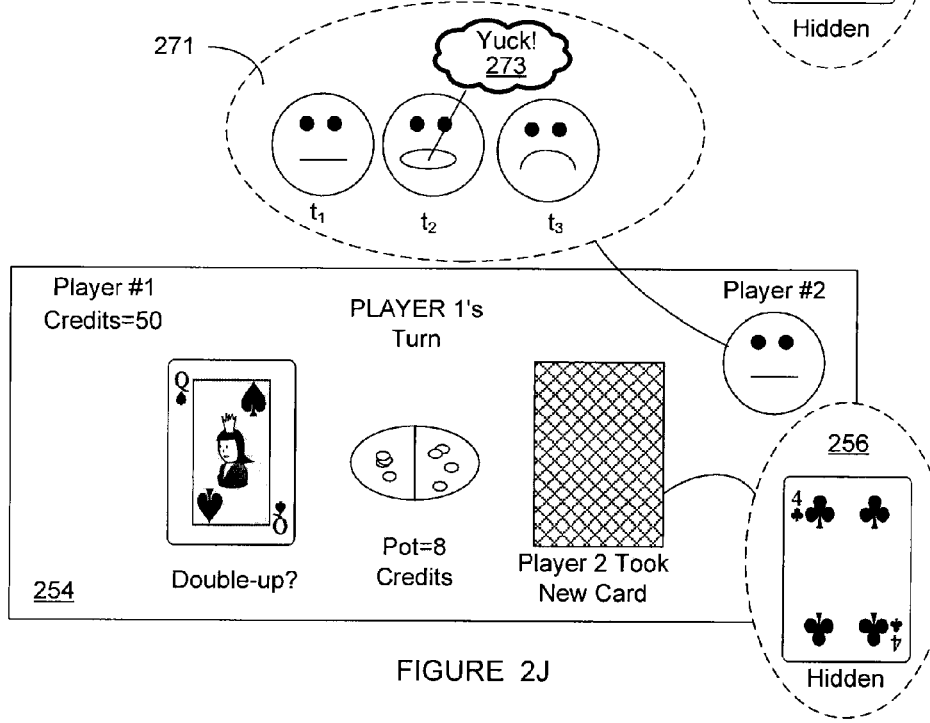

With respect to the previous examples, it was described that the virtual and live players took turns making decisions. In some embodiments, in a game, live and virtual players can be required to make simultaneous decisions. In FIGS. 2I-2J images 248 and 254 related to the game previously discussed with respect to FIGS. 2A-H is described. In this example, in image 248 live player 1 and virtual player 2 have each received an initial card. Live player 1 has received a queen of spades while virtual player 2 has received a 2 of diamonds which is hidden to player 1 but shown as revealed in 252 for the sake of clarity. The players have each bet 4 credits and the pot is eight credits.

Each player is required to make a decision of whether to take a new card or not, i.e., a simultaneous decision. The gaming device can be configured so as not to reveal the decisions of each player until it has received the decisions of all the players. An animation 250 can be shown for the virtual player 2. In the animation, a virtual character representing virtual player 2 is shown with a neutral expression, saying yuck 270 and then exhibiting a sad expression. This animation can be triggered in response to the virtual player receiving a 'bad' game position, i.e., a two of diamonds.

The decisions of each player can be revealed in one or more images. The one or more images can be rendered to provide animations of various actions. In this example, it can be indicated that player 2 took a new card and player 1 kept their card or it can be simply indicated which players took new cards. The game position prior to the decision to change their game position may or not be revealed, i.e., in this example the value of the card the virtual player discarded. In some embodiments, a player can be afforded an opportunity to change their game position but at a cost. For instance, live player 1 or virtual player 2 could have been required to provide one or more additional credits to change their game position by drawing a new card.

In other embodiments, a player's behavior, such as related to decisions and game positions can be conveyed using an animatronic/robotic devices. For instance, a gaming system can comprise a robotic device that mimics human facial and/or body motions. This device could be a freestanding element associated with a gaming table or a bonus device, such as an animated face associated with a gaming machine. For example, animatronic/robotic device can be provided as free standing and positioned at a traditional gaming table, such as poker, black jack, baccarat, or other card game that can be played electronically between players. One or more animatronic/robotic devices can be configured to provide cues, gestures, audio, and/or facial expressions as it relates to its game strategy or positioned such that a head to head game could be played with a live player against a virtual player utilizing animatronic or robotic devices.

Returning to FIG. 2J the image 254 shows a game situation where after making simultaneous decisions, player decisions revert to a turn based format. In general, in various embodiments, all decisions in a game can be turned based, all decisions can be made simultaneously or combinations thereof. In 254, the live player is offered the opportunity to double their bet. Virtual player 2 has drawn a second card as indicated. The value of the new card is a 4 of clubs. It is shown as hidden information 256 in FIG. 2J, i.e., hidden information is information not available to one or more game players participating in a multiplayer game. The hidden information is shown in the FIG. 2J for illustrative purposes.

An animation sequence 271 is associated with the image 254. Thus, image 254 could be associated with a plurality of images where parts of image 254 are changed to reveal the animation sequence while parts remain constant. For instance, the credits available to player 1 would not change in image 254 as it was redrawn in a sequence of images to reveal the animation 271. In other embodiments, the animation sequence 271 does not have to be a part of the image 254. For instance, image 254 and images associated with the animation sequence 271 could be output to separate displays or to different windows in the same display where image 254 and the animation sequence 271 are generated by different logic entities. More details of generating presentation including animation sequences are described with respect to FIG. 3.

The animation sequence 271 shown the virtual player saying 'yuck' 273 and could be identical to the animation sequence 270 shown with respect to FIG. 2I. The animation sequence can have been triggered in response to the virtual player's game position again being poor. Thus, since this behavior of the virtual behavior was conveyed prior to drawing a new card and after a new card, the gaming device and associated game can be configured to provide this information to the live player with the intention that the live player can interpret this behavioral information to indicate the virtual player still has a bad hand even though value of the original bad hand may have not been revealed to the live player.

It can be assumed in constructing the game, which includes the behaviors that are conveyed, that a live player will interpret the decision of the virtual player to draw a new card as indicating their original hand was not good and a repeating of the behavior after a new card is drawn to indicate that their new hand is also not good. An expected payout for the game can be based upon this assumption, i.e., the live player correctly uses the information to their advantage and hence gains an advantage during certain game positions. The advantage of the conveyed behavioral information is that it can lead other players to make decisions that are more favorable to the player obtaining a desired outcome. Nevertheless, the gaming device does not control how other players, such as a live player, use conveyed behavioral information and whether they are using it correctly or not. Thus, the expected payout can vary between live players depending on whether they correctly interpret a virtual player's behavior conveyed by a virtual character.

Figure 2K:
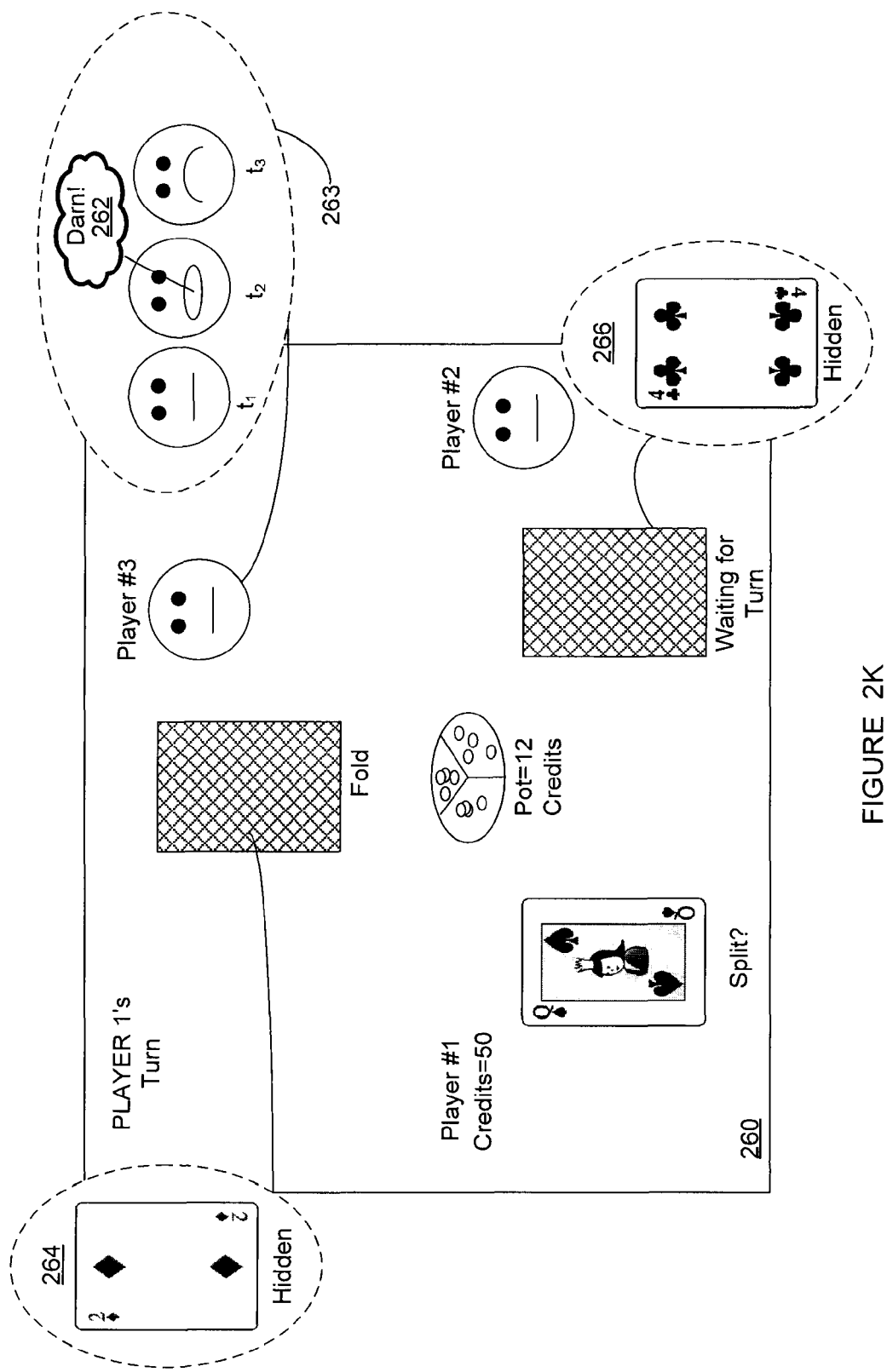

With respect to FIG. 2K, an embodiment of the war game described with respect to FIGS. 2A-2J, is discussed. In FIG. 2K an image 260 involving a war game including 3 players is described. Player 3 is a virtual player, player 1 is a live player and player 2 could be either a live player or a virtual player. Players 1, 2 and 3 can each receive a card indicative of their initial game position. Player 1 has a queen of spades, player 2 has received a two of diamonds and player 3 has received a four of clubs. The pot is shown as a table divided into three parts where each of players 1, 2 and 3 have contributed 4 credits for a total pot of 12 credits.

The 2 of diamonds and the 4 of clubs are hidden information 264 and 266 in the figure, i.e., this information is not shown to player 2. If player 3 is a live player and participating in this game in gaming device separate from player 2, a controller providing the multiple player game can be configured to determine for each player what information is to be revealed and what information is to be hidden. In response, a different game presentation game can be generated for each live player with different combinations of revealed and hidden information. For instance, when player 3 is a live player, a game presentation can be generated for player 3 that shows their game position as being revealed while players 1 and 2's game position is not revealed (e.g., their cards are hidden.)

The gaming device can determine that virtual player 3 is the first to make a decision, in response, virtual player 3 can decide to fold, which is indicated in the image 260. An animation sequence 263 can be associated with virtual player 3's decision. For instance, the virtual player 3 can be shown as saying a message 262, such as 'darn', and their facial expression can be shown as changing to a sad face.

Next, the gaming device can be configured to determine that each of players 2 and 3 are to be offered an opportunity to split player 3's bet. The next position in the game can be based upon a combination of decisions of both player 1 and player 2. If both players' decide to split then each could be credited with half of player 3's bet. If neither player decides to split or only one player decides to split, then the game continues as a war between player 1 and player 2 where the winner of the war gets all of player 3's bet as well as any additional bets made by the other players. In the case of a split, i.e., both players decide to split, in one embodiment, the game could end with at least a portion each of player 1 and player 2's wagers being immediately returned and each player receiving a portion of player 3's winnnings. In another embodiment, players 1 and 2 could each be credited with a portion of player 3 bet but then continue their war against each other where player 1 or 2 will be afforded the opportunity to win from each other.

The decision to split or not could be required to be made simultaneously where either player does not what decision the other is going to make (i.e., in parallel) or sequentially, such a first player 2 then player 1 or first player 1 then player 2 where one or the other player have information about the other player's decision when they make their decision. The decision to split or not to split for either player 1 and 2 may not change the underlying game position because their cards do not change in response to the decision and in some embodiments the game continues. Nevertheless, the outcome of the game and the associated award for each player can change in response to the decision.

Further, each player's decision to split or not does not affect only the outcome for themselves but for the other player as well. For instance, when both players cooperate and split both players can receive a reward which is beneficial to both players. Thus, a player in the games described herein can be required to make a decision that has an outcome that benefits both themselves and other players and may have to weigh this against a decision that has a benefit for only themselves, such as trying to win the entire pot verses splitting it.

Further to the example of the split described above, there are many types of games where outcomes for each player are based upon a combination of decisions made by each player where various combinations of decisions can have outcomes that are relatively more or less beneficial to each player. Examples of such games that can be played in this manner include chicken, prisoner dilemma and paper, scissors, rock. Optimum decision making in these games, as well as the games previously described, can be analyzed using game theory.

In one embodiment, a game of chicken may be played between one or more players and one or more virtual players. When the game is played between one player and one virtual player, the virtual player can be a computer generated set of possible choices including GO STRAIGHT or SWERVE computed by the player's gaming device. The player can be given the same plurality of options including GO STRAIGHT or SWERVE.

The gaming device can compute possible payouts using a random number generator then communicates the possible payouts to the player. For example, the possible payouts may be 0 if both the virtual player and the player choose GO STRAIGHT, the payout may be 100 credits if the player chooses GO STRAIGHT when the virtual player chooses SWERVE, or the payout may be 10 credits when both the virtual player and the player chooses SWERVE. The player can also be notified by the game that the virtual player chooses GO STRAIGHT 10 percent of the time and SWERVE 90 percent of the time or the live player can learn this information via trial and error. The player then selects their choice, which is input into the gaming device.

The decision making behavior of the virtual player can also be represented by a virtual character's animated behavior or appearance. For instance, a virtual character that swerves 90 percent of the time could be depicted with one appearance and animated with one set of behaviors while a virtual character that goes straight 90 percent of the time could be depicted with another appearance and animated with another set of behaviors. The behaviors and appearance selected for each character could be selected to be consistent with their game playing habits. For instance, a virtual character that goes straight 90 percent of the time can be depicted with a crazy appearance and crazy behaviors, such as young wild boy, while the virtual character that swerves 90 percent of the time can be depicted with an appearance and behaviors associated with being fearful or time, such as an old lady. Of course, as previously mentioned, the present invention is not limited to the animation of 'human' characters and characters with non-human features can also be employed. For instance, in the game of chicken, the virtual characters could be depicted as chickens or with chicken like features.

The game payout and odds can be determined by the table of possible outcomes corresponding to the specific game embodiment. For example:

|  |  | VIRTUAL PLAYER | |
|---|---|---|---|
|  |  | Go Straight | Swerve |
| PLAYER | Go Straight | 0, 0 | 100, 10 |
|  | Swerve | 10, 100 | 10, 10 |
|  |  | 1/10 (10%) | 9/10 (90%) |

Once the player selects their choice, the gaming device can calculate the choice of the virtual player based on the weighted probability of each choice within the set of choices. In the example presented, the gaming device can select GO STRAIGHT 10% of the time verses SWERVE 90% of the time. Once calculated, the gaming device can provide a plurality of various presentations to communicate the game outcome to the player. For example, a textual representation of the game outcome, an animation of the game outcome, a video segment can be played corresponding to the selections and the outcome, or any combination of textual, audio, video, and graphical animation.

In one embodiment, a game of Paper, Rock, and Scissors may be played between one or more live players and one or more virtual players. For example, the game may be comprised of three choices for the live player and three choices for the virtual player. Each choice may include a rule to determine a winning outcome. For example, in the game Paper-Rock-Scissors, the player and the virtual player each have three choices. That is, the choices the live player can make comprise the set s={PAPER, ROCK, SCISSORS} and the choices the virtual player can make comprise the set s'={paper, rock, scissors}. Thus when the game is played by 1 live player and 1 virtual player, the game includes the strategy sets Si=(PAPER, paper), (PAPER, rock), (PAPER, scissors), (ROCK, paper), (ROCK, rock), (ROCK, scissors), (SCISSORS, paper), (SCISSORS, rock), and (SCISSORS, scissors).

The payoff function Pi for each game strategy set Si is determined by the gaming device and weighted according to the rules of the game. For example, the payoff possibilities represented by the following table with payoffs in game credits:

|  |  | Virtual Player | | |
|---|---|---|---|---|
|  |  | Paper | Rock | scissors |
| Player | PAPER | $0, $0 | $5, −$5 | −$5, $5 |
|  | ROCK | −$5, $5 | $0, $0 | $5, −$5 |
|  | SCISSORS | $5, −$5 | −$5, $5 | $0, $0 |
|  | Probability Played by Virtual Player | 33.33% | 33.33% | 33.33% |

The probability that a particular strategy set Si will be played by the virtual player is defined randomly by the gaming device for each iteration of the game. For example, in one embodiment of the game, the virtual player may make each of the possible selections 33.3% of the time. In other embodiments, the virtual player may make the selection of ROCK 40% and SCISSORS 40% of the time and PAPER only 20% of the time. For example when the virtual player makes the selections 33.3% of the time, the live player has a chance to win $5, lose $5 or receive no payout depending on the strategy set Si played by the players. The payout function Pi may comprise any number of random payouts defined prior to each iteration of the game or may be a predetermined amount for this particular game.

In one or more embodiments of the game and as described previously, a virtual player animation may establish clues as to the particular choice the virtual player may likely select. For example, the virtual player animation sequence may include an angry aggressive roughen animated image which the live player may relate to as a virtual player that may make the ROCK choice or the SCISSORS choice, but not the PAPER choice. The game is played by the animation sequence occurring prior to, during and after the selection is made by the live player. When the live player makes their selection, the game automatically triggers the virtual player to simultaneously make their selection. The result is displayed after the live player has made their selection. Credits are awarded to the live player if they won, no credits if there was a tie and the player loses credits when the virtual player wins Animation sequences continue throughout the game and in between games to give the live player an impression of what the virtual player may play next time in order to develop a game strategy. In other embodiments, the virtual player may change each game or periodically change in between games.

In other embodiments of the game, the game may be played by a plurality of players against one or more virtual players. For example, when 3 players are playing against one virtual player, the payoff function may be based on the number of players and adjusted accordingly. When this game is played by more than 2 players, the game may add a plurality of virtual players then base wins or loses based on the numbers of SCISSORS, ROCKS and PAPERS. For example, if there are 4 players and 1 player selects SCISSORS, 1 player selects PAPER and 2 players select ROCKS, the 2 ROCKS smash the SCISSORS, but the PAPER player covers the ROCK player and wins. Many combinations are possible and may be adjusted to add in virtual players to ensure there will be a winner. However should the game end up with an even number of each selection, the game is considered a draw and no one wins.

As the game is played, each live player is able to view the animations associate with each virtual player to aid in determining their game strategy. For example, with two live players and two virtual players, each live player would be able to visually view the virtual players on the live player's gaming machine. Additionally, each virtual player may go through a series of animations establishing their particular game play style and strategy as visual cues to the live players each of which may or may not pick up on the meaning of said cues.

The games described above can be part of multi-round games. For instance, in the game of war described above, such as described with respect to FIG. 2K, three or more players could start the war, an after each round one or more players could be eliminated. For example, the player with the lowest hand could be eliminated and the remaining players could play against each other. In another example, the game of war could comprise 3 or more rounds with the player with the most wins after the rounds winning some award. In yet another example, in the game of chicken described above, a large number of players could participate in pairs where losing players could be eliminated and winning players could play each other in a number of rounds or a number of games could be played where players with wins above some cut-off value could advance.

Figure 3:
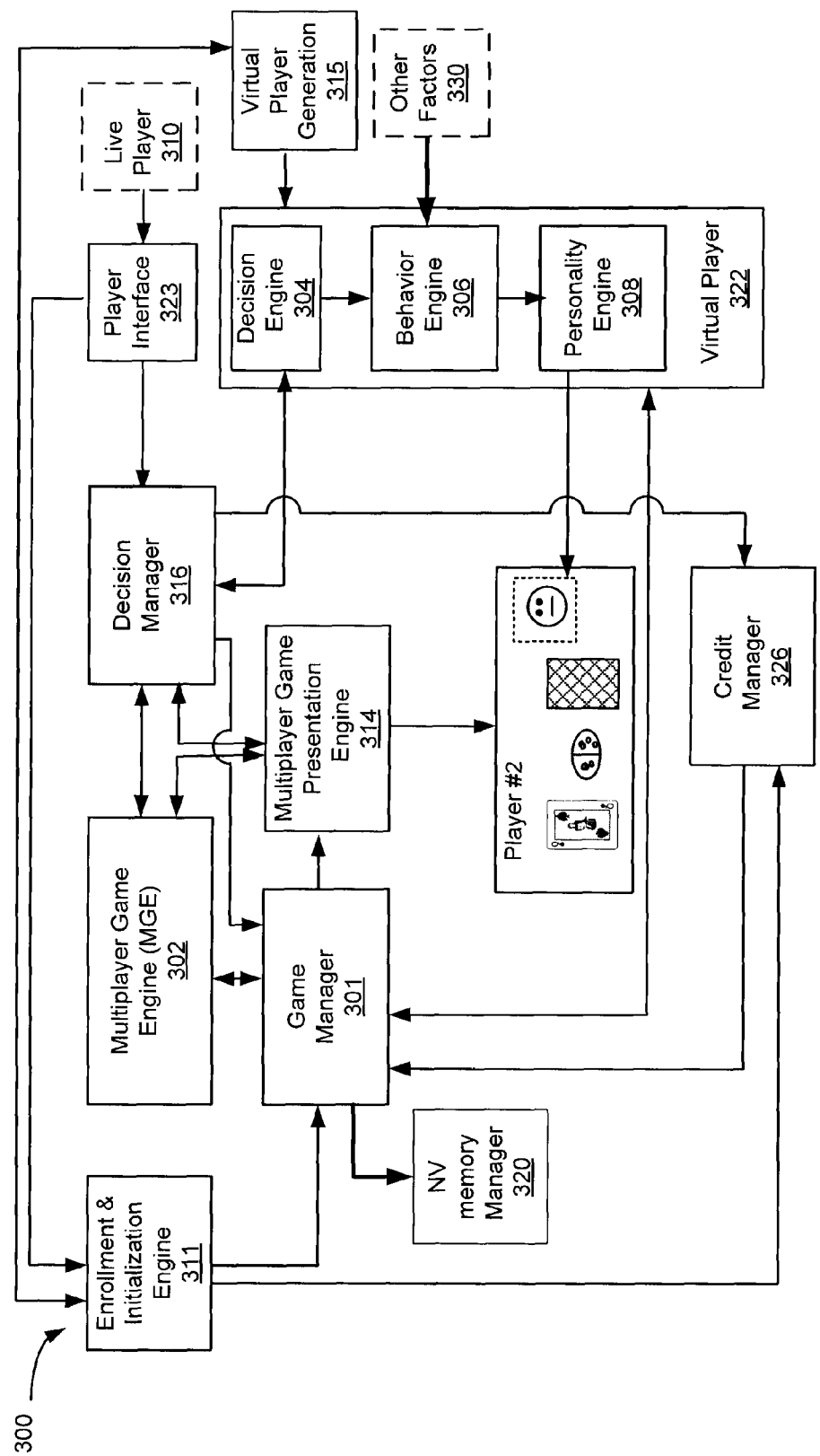
FIG. 3 is a multi-player gaming system for one embodiment of the present invention.

FIG. 3 is a block diagram of a gaming system for one embodiment in this invention. In various embodiments, the elements in the blocks shown with respect to FIG. 3 can be embodied as a single game device or can be distributed among a plurality of gaming devices, such as within one or more of the gaming devices described with respect to FIGS. 4-6. Further, logical entities can be combined and separated to provide various architectures and is not limited to the architecture described with respect to FIG. 3 which is provided for illustrative purposes only.

The gaming system 300 can be used to provide primary games or bonus games or subcomponents of game or any combination thereof. For instance, the gaming system could provide a play of a multiplayer game in response to a bonus being triggered in a play of the slot game. The bonus game can be used to provide a player of the primary slot game a chance to win an additional award. Further, when played as a primary game, the multiplayer game can be configured to provide bonus opportunities as well. For instance, a bonus triggered from a multiplayer game could be the play of a slot game or the play of another type of multiplayer game.

A secondary game triggered from a primary game does not necessarily have to occur as a bonus. As example, in the war game described with respect to FIGS. 2A-2K, when the player's tie, a second game could be triggered to settle the tie, such as each player being dealt a new card and the player with the highest hand winning, if a tie again occurred the process can be repeated until one player wins.

Returning to FIG. 3, the gaming system 300 can include one or more player interfaces 323. The player interface may include input buttons, touch screen input devices and other input mechanisms that allow a live player to initialize a game, make game decisions, make wagers, input cash or indicia of credit and combinations thereof. The player interface can also include output devices, such as reels, wheels, video displays, lighting associated with the perimeter of the gaming device, and speakers for outputting a presentation associated with the game and value handling devices, such as printers, card reader/writers, used to output cash or indicia of credit associated with the game.

The enrollment and initialization engine 311 can be used to allow one or more live players to join in the play of multiplayer game. In one embodiment, after one or more live players have joined a multiplayer game, the initialization engine 311 can provide commands or instructions for instantiating one or more virtual players. These commands and/or instructions can be sent to a virtual player generation module 315 which in response creates one or more virtual players, such as 322. The enrollment and initialization engine 311 can notify the game manager 301 and the credit manager 326 in regards to how many players are going to participate in the game, the credits that have been registered and which players are live and which players are virtual characters.

The gaming system 301 can be configured to provide a suite of virtual players represented by different virtual characters. These virtual characters can be configured to convey different behaviors and personalities. In one embodiment, the gaming system can randomly select one or more virtual characters to participate in the game. In another embodiment, the gaming system can be configured to allow a live player to select a virtual character for participation in the game.

In various embodiments, the gaming system can be configured to allow new virtual characters to be added and old virtual characters to be retired. In yet other embodiments, when a suite of virtual characters are provided, the virtual characters can be configured to reveal not only behavioral information about themselves but behavioral information about other virtual characters. For instance, during a play of a game provided by the gaming system, a first virtual character could be configured to say that another virtual character behaves a certain way during game play, i.e., one virtual character could reveal a tell about another virtual player. The virtual characters can be configured to comment about the other virtual characters in positive and negative manners. For instance, some virtual characters can be configured to make comments that convey that they like or dislike another virtual character.

The game manager 301 can be configured to provide signaling/timing information that allows other game components to determine when it is time to advance to the next game state. Other game components such as components providing presentations can be configured to wait for the signaling/timing information before advancing to a next game state. The game manager 301 can also be configured to manage the state of the game including collecting 'critical' game information. The critical information can be stored and retrieved from a non-volatile memory, such as battery backed Non-Volatile (NV) RAM, flash memory, a hard-drive, or other storage device, via the non-volatile memory manger 320 during each game state. In the event of a malfunction, the critical game information stored in the non-volatile memory can be used to reconstruct a game state that was generated prior to the malfunction, such as a power failure.

Examples of critical game information can include information relating to credits stored on the gaming device, decisions made by virtual and live players and game positions for each virtual and live player during various games states in the play of the game. The non-volatile memory can also be used to store a game history of a past game that was played that can be recalled in the event of a dispute. Using the information stored in the non-volatile memory by the NV-RAM, a portion of a game previously played can be reconstructed. The reconstruction can include decisions made by either or both of live player and virtual players and their associated game positions. The game history may also be uploaded to an external Gaming System to store to enable the Gaming System to learn from previous gaming sessions and combinations of live and virtual players to further enhance the virtual players play style for later games. The information may also be uploaded to an external Gaming Session for data reporting and analysis to provide game designers with critical game play information to build future games.

The game manager 301 can signal a multiplayer game engine 302 that it is time to initialize a new game involving a certain number of players. In one embodiment, the multiplayer game engine 302 is a piece of stand-alone code that does not distinguish between live players and virtual players. It is responsible for determining an initial game position and advancing the multiplayer game to final position. Based on the final position of the game and/or other game decisions made during the game play, the multiplayer game engine can be configured to determine an outcome to the game. The multiplayer game engine 302 can be stored in a secure memory source and authenticated during initialization of the gaming system 302 and during operation of the gaming system 300, if desired, to provide assurance to both regulators and players that an approved version is being utilized. The decision engine 304 and other game components can also be treated in this manner.

An advantage of embodying the game engine as a standalone module is that once it is approved by a gaming regulatory authority it can be reused in different game implementations. For instance, the same multiplayer game engine could be used in two different game implementations involving different suites of virtual characters or the same multiplayer game engine could be used in an implementation of a primary game and a different implementation of a bonus game. Further, an advantage of having the multiplayer game engine not distinguishing between live and virtual players is that it can be instantiated to provide a game involving variable numbers of live and virtual players where the players and regulators can be assured that virtual players playing for the house are not given an advantage over live players.

In one embodiment, live players can be allowed to access a portion of the gaming system including the multiplayer game engine and a suite of virtual players and play against the virtual players for free. For instance, an application could be provided for player on a player's smart phone or home computer. These applications can be used to allow a live player to learn about the behaviors of a virtual player before engaging them in game player where they put money at risk.

Returning to FIG. 3, the decision manager 316 can be used to track and route decisions that are required during game play. For instance, the decision manager 316 can receive input from one or more player interfaces, such as 323, and convert the information into a format readable by the multiplayer game engine 302. The conversion process can allow different gaming devices with different player interfaces to participate in a multiplayer game. The decision manager 316 can also receive information relating to decisions from one or more virtual players, such as 322. The decision manager 316 can notify the game manager 301 in regards to what decisions are required during each game state, which can involve decisions from multiple player, and whether the decision has been made or not.

When the multiplayer game engine 302 sends out information to the decision manager 316 in regards to a decision being needed, the decision manager 316 can be configured to route this information to an appropriate logical entity. As described above, the multiplayer game engine 302 can be configured such that it does not distinguish between virtual players and live players and indicates when decision information is needed from a particular player. The decision manager 316 can be configured with information that allows it to route information regarding a decision required by each player and receive information about the decision from each player. Further, as described above, the decision manager can configured to format the information so that it is understandable to each the recipients, such as virtual players and the multiplayer game engine.

The decision manager 316 can be configured to notify each player, virtual or live, of a needed decision and information needed to make the decision. In the case of a virtual player, such as 322, the decision manager can be configured to communicate with a decision engine 304 associated with the virtual player 322, information regarding a type of decision to be made and information needed to make the decision, such as a current game position for the virtual player and any other information that it is allowed to see regarding other players generated by the multiplayer game engine 302. In response, the decision engine 304 can reply back to the decision manager 316 information describing the requested decision. In the case of a live player, the decision engine 316 can notify the multiplayer game presentation engine 314 to include information in its presentation indicating a decision required by a live player 310.

In one or more embodiment, the system may be configured to provide a default decision for a live player. For example, when a live player fails to make a decision within a given time interval, a default decision is made for the live player in order to keep the game progressing for all players.

Virtual and live players, such as 310, can be involved in decisions involving changes of credit, such a wager amount. The decision manager 316 can receive this information and notify the credit manager 326 to update the credit balance that this particular decision has been received, notify the game manager 301 to store this critical information and notify the multiplayer game engine 302 of the decision. The credit manager 326 can notify the game manager 301 when this change has been made. After a player's credit balance has been changed, the multiplayer game presentation engine 314 can receive an update from one of these entities to update credit balances that are generated in a presentation output via the multiplayer game presentation engine 314.

The multiplayer game presentation engine 314 can be used to present game positions and outcomes of the multiplayer game to one or more live players. It can receive information generated from various logical entities, such as but not limited to the decision manager 316, the game manager 301 and the multiplayer game engine 302 and generate a presentation that is consistent with the current game state. The presentation can comprise visual and audio components. In one embodiment, the visual components can include still images and animations presented as a series of images output to a video display associated with the gaming system.

In some games, as previously described, each player can be provided a portion of the game position for the game. For instance, their game position can be revealed while other player's game position remains hidden. In one embodiment, a multiplayer game presentation engine 314 can be instantiated for each player, whether virtual or live. At instantiation, the multiplayer game presentation engine can be configured so that the correct information is revealed and hidden for each player. In the case of the virtual player, the presentation that is generated may not be output to the display device. Nevertheless, information about the presentation or frames from the presentation for the virtual player could be stored to provide a history of the game. Since the presentation for the live player may not show all of the information about the game position of the virtual player, a presentation of the virtual player's game presentation in combination with a presentation associated with the live player could be used to provide a more complete history of the game.

A virtual player, such as 322, can comprise a decision engine, such as 304, a behavior engine, such as 306 and a personality engine 308. The decision engine can be configured to determine decisions that are to be made for the virtual player. Both live players and virtual players can be presented with identical types of decision that need to be made. The behavior engine 306 can be configured to determine whether a behavior of the virtual player is to be revealed. The personality engine 308 can translate a revealed behavior into an action by a virtual character, such as a face of a virtual character changing from one expression to another expression.

One advantage of formulating the virtual player in this manner is that the same decision engine could be reused for multiple virtual players where each virtual player could comprise a different behavior engine, a different personality engine or combinations thereof. Since the decision engine is not changed, it may be possible to reuse it without resubmitting it gaming regulators for approval. Another advantage is that the behavior engine 306 may also be reused. For instance, two virtual characters could share a common decision engine and a behavioral engine such that the behaviors for each player are revealed in the same manner. Nevertheless, the virtual characters could appear to behave very differently because their appearance and the action associated with each behavior is different for each of the virtual characters because a different personality engine is associated with each virtual character. The different personality engines can be configured to reveal the same behavior with different presentations that are applied to different virtual characters. For instance, a first personality engine could reveal a behavior as a first virtual character scratching their head, while a second personality engine could reveal the same behavior as a second virtual character winking. Again, this architecture can allow the behavior engine to be reused without resubmitting it to regulators. Thus, speeding up and simplifying the virtual character generation process.

The behavioral engine 306 as described above determines when a behavior of the virtual player is to be revealed. The revealed behavior may or may not be associated with a game position or decision made by the virtual player. For instance, the behavioral engine 306 can trigger at random, behaviors of the virtual player that are translated into an action of the virtual character by the personality engine. While at other times, as previously described with respect to FIGS. 1 and 2A-2K, the behavioral engine can be configured to reveal information about the virtual player that relates to their game position and/or decision making strategies, which is translated by the personality engine into a behavior of a virtual character.

To determine when to trigger a behavior, the behavioral engine can use information related to the game, such as the current game position or a current decision that is being made by the virtual behavior. It can also use information that is equally revealed to all player's playing the game, such as a decision made by another live or virtual player to trigger when to reveal a behavior. Further, factors outside the game play can be considered, such as 330. These factors could involve such information as a time of day, day of the week, season or holiday period or information known about the player, such as information garnered from player tracking account associated with the player.

The personality engine 308 receives information that a behavior has been triggered and translates it into an action by a virtual character. This action can be presented as a multimedia presentation, such as images output to a display screen and sounds output to a speaker. In some embodiments, the game manager 301 or some other logical entity can allocate resources to multiplayer game presentation 314 and the personality engine 308, such as a portion of a display screen or separate display screens for each of the engines to use. Then, the engines can independently output their presentations, such as the presentation shown in the figure. In other embodiment, the engines could each generate their presentations separately and then another logical entity could be used to integrate the separate presentations into a single presentation for output to one or devices associated with the gaming system.

The decision engine 304 can comprise a formulation for determining a response to each game decision. If the underlying game were simple enough, the decision engine could be formulated as a look-up 'response' table. The response table would indicate for what decision is to be made in each game situation. This formulation is similar to a paytable employed for a slot machine. The decision engine 304 could be submitted to regulators and independently tested to insure that it does not cheat, i.e., use or have access to information that is not equally available to the other players. An optimal decision engine can be developed using game theory to determine in any game situation what the optimal decision that is to be made. For instance, to optimize the virtual player's chance of winning Development of decision engines are described in the following section and determining expected payouts for games using these decision engines are described in the following section.

In a particular embodiment, virtual players can be provided as modules for other systems. In particular, virtual characters represented by various personality engines can be provided as plug-ins for various systems. The personality engines can provide animations of behaviors and decisions that are associated with a particular system.

Game Theory and Expected Payout

Game theory can be used to develop a decision engine for a game used by a virtual player, such as described above with respect to FIG. 3. In game theory, the term "game" means a particular sort of conflict in which n individuals or groups (known as players) participate. A list of rules can stipulate: the conditions under which the game begins; the possible legal "moves" at each stage of play; the total number of moves constituting the entirety of the game, and the terms of the outcome at the end of play. A move is the way in which the game progresses from one stage (or position) to another, beginning with an initial state of the game through to the final move. Moves may alternate between players in a specified fashion or may occur simultaneously. Moves can be made either by personal choice or by chance. For chance moves, the probabilities of the move occurring can be calculable. "Payoff", or "outcome", refers to what happens at the end of a game. In a game, such as chess, payoff may be as simple as declaring a winner or a loser. In casino gaming devices payoff is usually an award, such as money or credits on a gaming device. The amount being predetermined by antes and bets amassed during the course of play.

Distinctions can be made in characterizing different forms of games. One distinction that can be made is between "extensive" and "normal" forms. A game is said to be in extensive form if it is characterized by a set of rules that determines the possible moves at each step, including: which player is to move; the probabilities at each point if a move is to be made by a chance determination; and the set of outcomes assigning a particular payoff or result to each possible conclusion of the game. The assumption can also be made that each player has a set of preferences at each move in anticipation of possible outcomes that will maximize the player's own payoff or minimize losses. A game in extensive form contains not only a list of rules governing the activity of each player, but also the preference patterns of each player. Common games, such as games employing playing cards (e.g., gin rummy), are examples of extensive games.

Because large numbers of strategies can be involved in even the simplest extensive games, game theorists have developed so-called "normalized" forms of games for which computations can be carried out completely. A game is said to be in normal form if the list of all expected outcomes or payoffs to each player for every possible combination of strategies is given for any sequence of choices in the game. This kind of theoretical game could be played by any neutral observer and does not depend on a player's choice of strategy.

A game can be said to have perfect information if all moves are known to each of the players involved. Chess is an example of a game with perfect information while poker and bridge are games in which players have only partial information at their disposal. A strategy is a list of the optimal choices for each player at every stage of a given game. A strategy, taking into account all possible moves, is a plan that cannot be upset, regardless of what may occur in the game.

Some examples of games that can be used herein are two-person, or dual games. These games include the largest category of familiar games such as backgammon or two-team games such as bridge. Two-person games have been extensively analyzed by game theorists. In extending the results of two-person theory to n-person games a difficulty can be predicting the possible interactions among various players. In most two-person games the choices and expected payoffs at the end of the game are generally well-known, but when three or more players are involved, many interesting but complicating opportunities arise for coalitions, cooperation, and collusion. Nevertheless, using game theory, a decision engine, such as 304, can be developed for multiplayer games involving more than two players.

A game is said to be a zero-sum game if the total amount of payoffs at the end of the game is zero, that is, the total amount won is exactly equal to the amount lost. In economic contexts, zero-sum games are equivalent to saying that no production or destruction of goods takes place within the "game economy". It has been shown that any n-person non-zero-sum game can be reduced to an n+1 zero-sum game, and that such n+1 person games can be generalized from the special case of the two-person zero-sum game. Consequently, two-person zero-sum games constitute a major part of mathematical game theory, which can be applied to the embodiments described herein. One of the most important theorems in this field establishes that the various aspects of maximal-minimal strategy apply to all two-person zero-sum games.

As an example, decision engines have been developed for card games such as poker that allow a virtual player or 'poker bot' to play poker for a live player in online poker games. Poker is a game of imperfect information (because some cards in play are concealed) thus making it impossible for anyone (including a computer) to deduce the final outcome of the hand. Because of this lack of information, the computer's programmers can implement systems based on the Bayes theorem, Nash equilibrium, Monte Carlo simulation or neural networks, all of which are imperfect techniques. This is unlike games such as chess where (because no information is concealed) a computer can play with greater accuracy than a human.

Methods can be developed to at least approximate perfect poker strategy and strategy for other card games, and games in general, from the game theory perspective in the heads-up (two player) game, and increasingly good systems are being created for the multi-player game. Perfect strategy can have multiple meanings in this context. From a game-theoretic optimal point of view, a perfect strategy is one that cannot expect to lose to any other player's strategy; however, optimal strategy can vary in the presence of sub-optimal players who have weaknesses that can be exploited. In this case, a perfect strategy would be one that correctly or closely models those weaknesses and takes advantage of them to make a profit, such as those explained above. Some examples of strategies that can be used to develop decision engines for various games described herein, such as poker, is titled, "Robust Strategies and Counter Strategies: Building a Champion Level Computer Poker Player," by Michael Bradley Johanson, Master's Thesis, University of Alberta, Edmonton, Alberta, 2007, which is incorporated herein by reference and for all purposes.

In embodiments, described herein, a virtual player decision engine for a virtual player does not have to be configured for optimal play. For instance, an optimal decision engine can be developed and then a sub-optimizer can be used to change decisions made by the optimal decision engine to non-optimal decisions. For instance, a virtual player can be configured to sometimes, play badly or sub-optimally, similar to how a live player can sometimes play. Thus, a virtual player, such as described with respect to FIG. 3 could include a sub-optimizer configured to determine when to change an optimal decision to a non-optimal decision and then to select what sub-optimal decision is to be made.

Once a decision engine is generated an expected payout for a game can be determined using various analysis techniques. For instance, in a Monte Carlo Approach, two virtual players can be pitted against one another and then many hands could be played including factors such as a casino taking a percentage of winnings by the casino to determine what the expected return percentage would be for a live player and for the casino. Information could be taken into account such as what advantage a live player can gain when particular behaviors of virtual players are revealed. Thus, the simulation could be configured to take into account games where virtual player reveal no information and games where virtual players reveal information that gives them an advantage over a virtual player and play many hands. Based upon the simulation of a large number of hands, a best case scenario for the live player can be determined. The rules of the game provided on a gaming device can be selected so that an expected payback percentage for a player over time is less than 100%.

Gaming System

Figure 4:
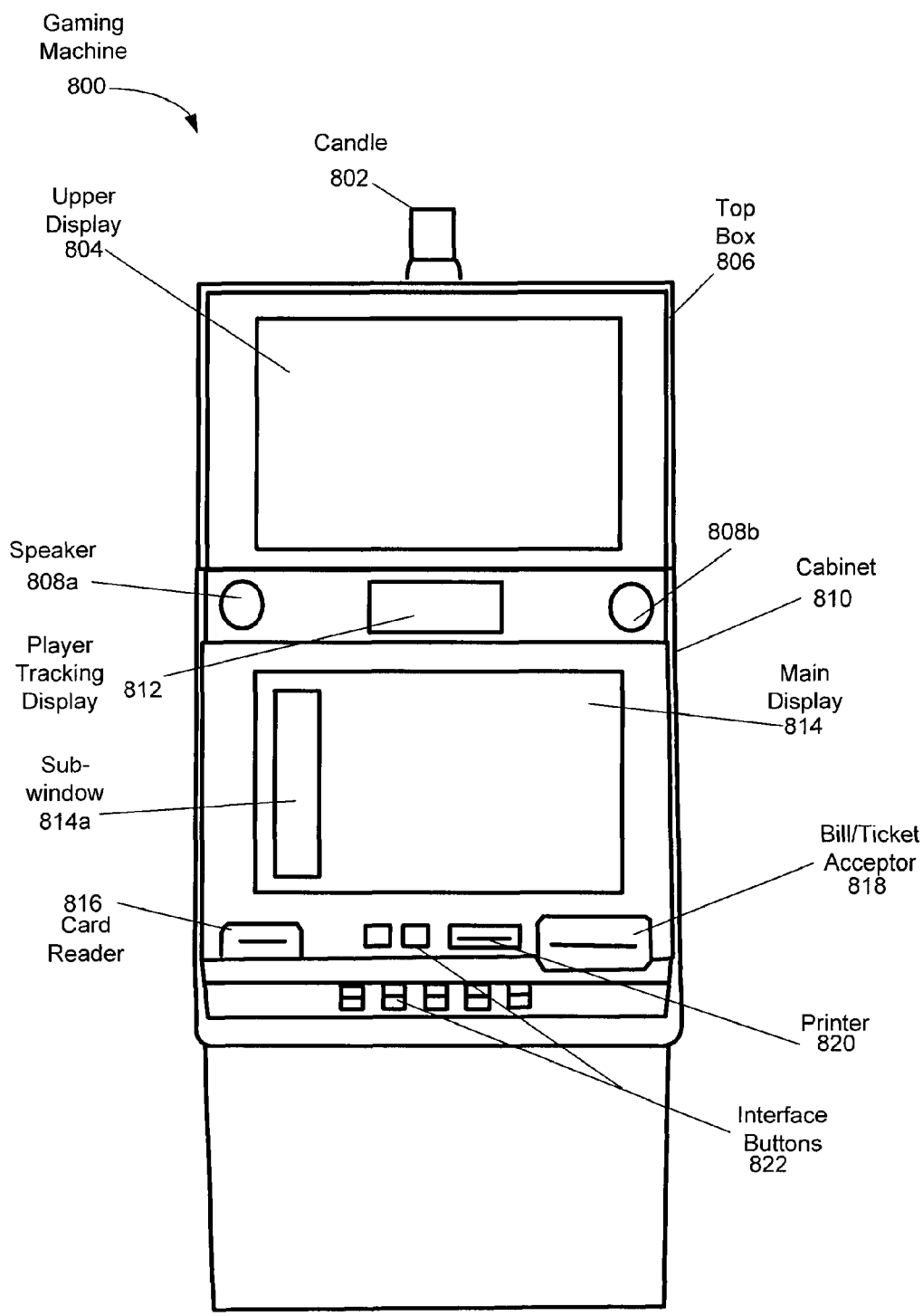
FIG. 4 is a front view of a gaming device for one embodiment of the present invention.
Figure 5:
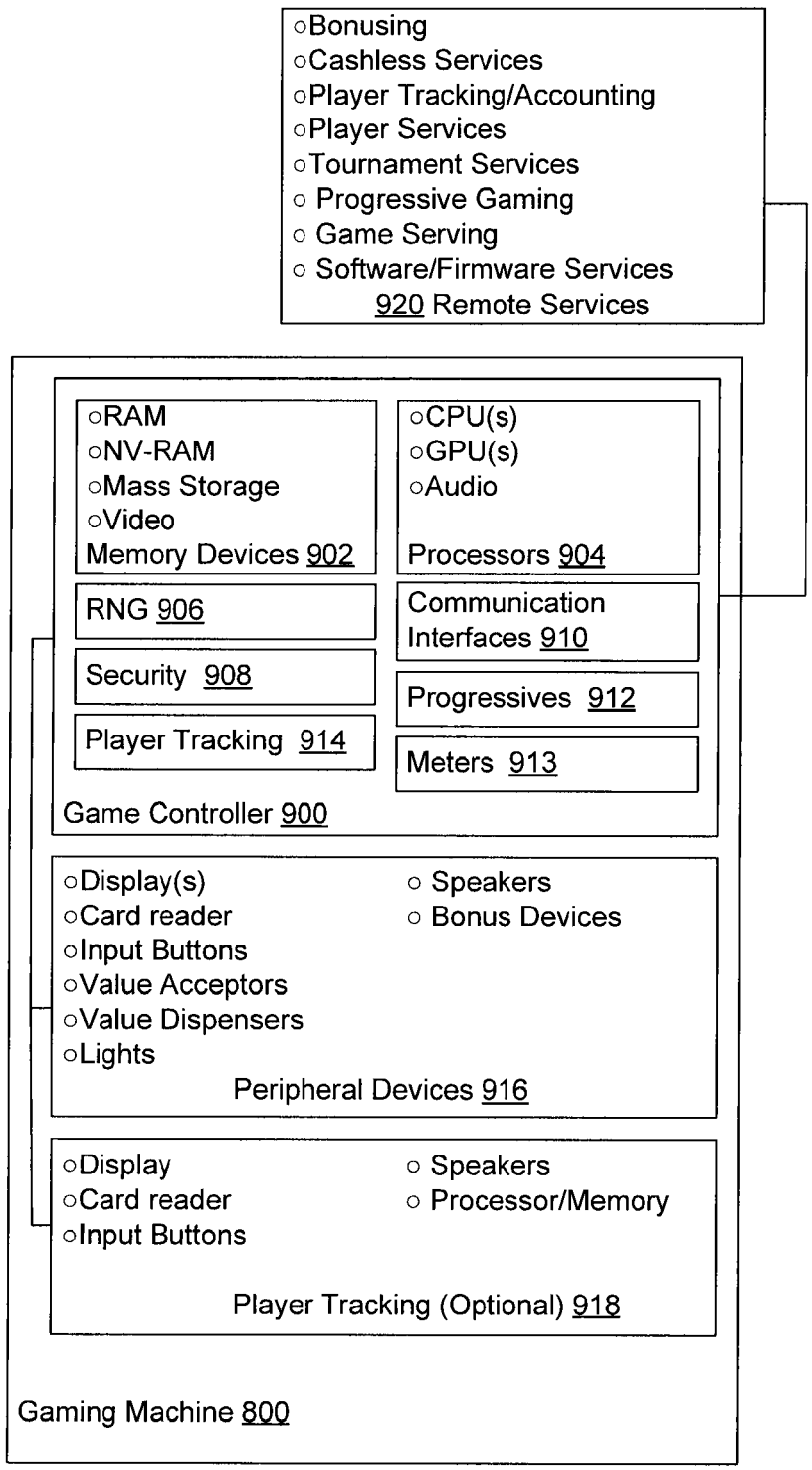
FIG. 5 is a block diagram of a gaming device for one embodiment of the present invention.
Figure 6:
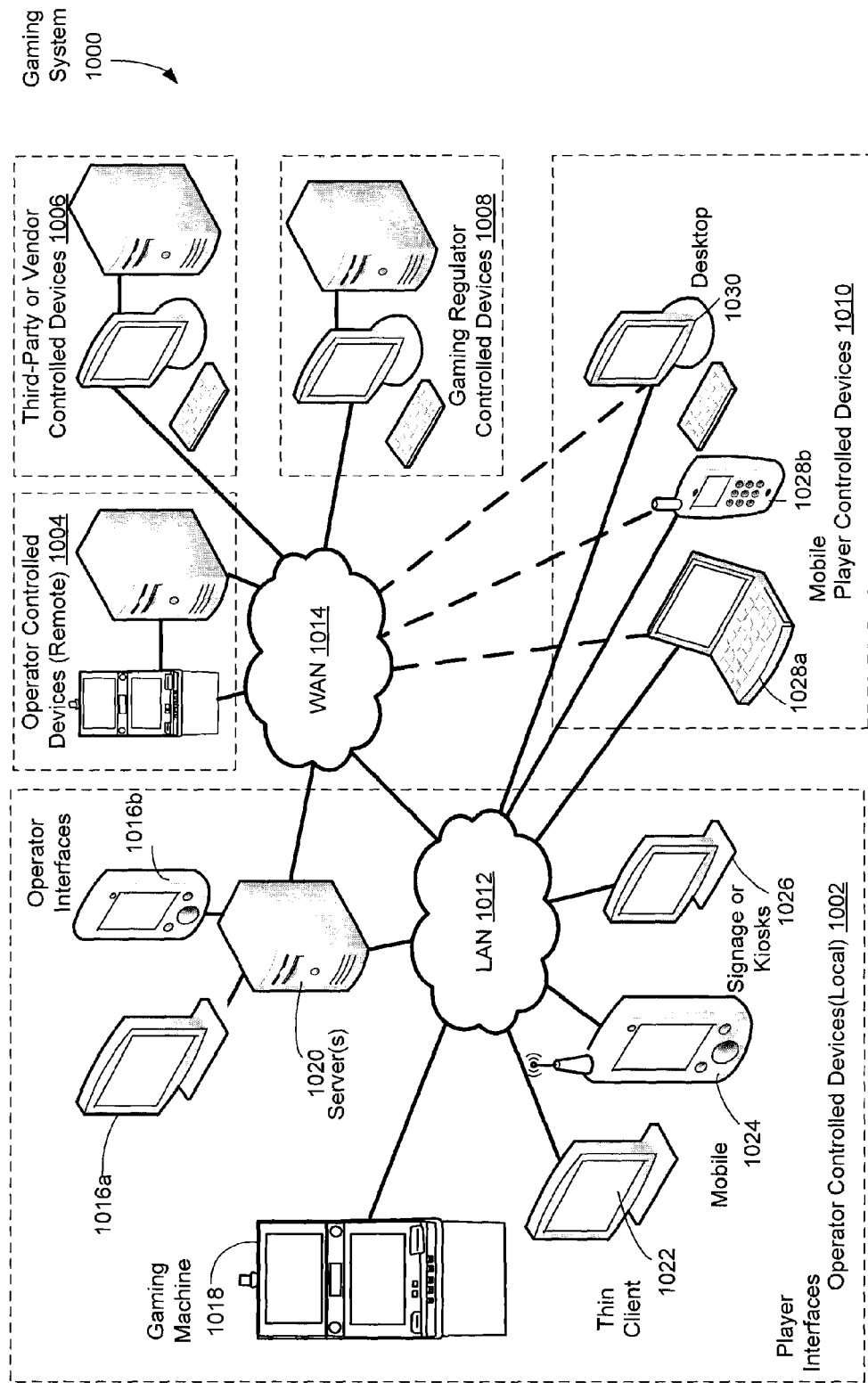
FIG. 6 is a block diagram of a gaming system for one embodiment of the present invention.

With respect to FIGS. 4-6 more details of a gaming system that can be utilized with the methods and apparatus described with respect to FIGS. 1-3 are described. Turning to FIG. 4 a video gaming machine 800 is shown. The gaming machine 800 can be comprised of a plurality of hardware and software components including the cabinet 810 that serves to enclose the gaming machine 800 electronic and software components and provides an overall physical presentation of a game play environment viewable by players for playing games. The main cabinet 810 includes a main display 814 for outputting game player related video images.

The video images can comprise information related to player and game play video information, video presentation of primary games and bonus games and video presentations showing behaviors of virtual players. The game video information and video presentations can be displayed to the player in one or more graphical windows and/or graphical sub-windows 814a. For instant, a video presentation of a multi-player game can be displayed in a main window of display 814 while a presentation of a virtual player's behavior can be displayed in a sub-window, such as 814a. A resource manager executed on the gaming machine can control access to the display and any display sub-windows by various processes executed on the gaming machine or on devices remote from the gaming machine.

In one embodiment, the gaming machine 800 can be configured to implement the gaming system 300 as described with respect to FIG. 3. In another embodiment, a portion of gaming system can be located on the gaming machine 800 while another portion is located on a remote device. For instance, the multiplayer game engine described with respect to FIG. 3 can be provided on a remote device where the gaming machine 800 provides a player interface 323 as shown in FIG. 3. In particular embodiments, the components of gaming system 300 can be split in various ways between the gaming machine 800 and one or more remote devices as are described with respect to FIG. 4-6.

The main cabinet 810 can further includes a bill/ticket acceptor 818 for accepting currency and/or ticket/voucher indicia wagers, promotional credits and other information from the player, a card reader 816 used, for example, to accept a player's affinity card, a player's debit card or a player's promotional card, a printer 820 for providing, for example, payouts and other paper communications such as promotions, comps or bonus awards to the player, interface buttons 822 used by the player to interface with the video gaming machine 800 for playing a game, speakers 808a and 808b for providing audio communication to the player as associated with the game played by video gaming machine 800. The video gaming machine 800 may optionally further include a top box 806 that may provide additional video communication and video entertainment to the player using upper display 804 to provide visual information to the player. The gaming machine 800 may also include a candle device 802 on top of the video gaming machine 800 to communicate the gaming machine's status and operational information to operators within the gaming establishment.

When a player selects the video gaming machine 800 to play waging games presented on main display 814, the player inserts currency or a paper voucher as indicia of credit into bill/ticket acceptor 818 which can be accepted by the bill/ticket accepter 818 to play a game on video gaming device 800. Once a players inserted cash or credit is acceptable by video gaming machine 800, the video gaming machine 800 can be used to play a game by a player.

In a typical operation of video gaming machine 800, a player first inserts currency or a paper voucher with credit indicia into bill/ticket acceptor 818 to initiate game play. The video gaming machine 800 displays visual effects using one or more displays 814, 804 and provides auditory effects out of speakers 808a and 808b that can be perceived by the player before, during and after game play. Auditory effects may include a plurality of sounds projected by speakers 808a and 808b simultaneously and synchronized with video effects including display animations, video, flashing and/or strobing lights in a plurality of colors and optionally providing video effects in one or more subwindows 814a. During the course of the game, the player can interact with the game to make additional wagers or selections that affect the outcome of the game. After the player completes one or more games on video gaming machine 800, the player may receive printed tickets/vouchers from the printer 820 with game credit indicia depending on the game outcome.

Turning now to FIG. 5, the software and hardware components of a gaming device, such as gaming machine 800 are further described. The video gaming machine 800 can include one or more game controllers 900 comprised of memory devices 902 used to facilitate player game play including for example one or more RAM, Non-Volatile (NV) RAM and/or video devices used to run game programs and store/retrieve game related information, processor devices 904 for executing game and related video gaming machine 800 operations including for example one or more CPUs, Graphic Processing Units (GPUs), and/or audio processing units, one or more RNG 906 devices to generate random outcomes for game and related game operations.

The communication interfaces 910 can be used by the video gaming machine 800 to communicate game and related information to players and attendants and remote devices 920. The security information 908 can comprise related hardware and software components to insure the integrity of the video gaming machine 800 and the operation of the game played by the player. The progressive components 912 can be for providing prizes to players that progress in value as players play games on the video gaming machine 800. The progressive components can be configured to communicate via the communication components 910 with remote devices, such as progressive servers. The player tracking 914 components can be used to interface with the player and provide optional affinity functionality to the player, and meters 913 used by the video gaming machine 800 to track game play and payout information.

The video gaming machine 800 can further comprises peripheral devices 916 including one more devices for example one or more displays, card reader, input buttons, one or more speakers, one or more processor and memory devices, value acceptors and value dispensers used for example to provide player wagering and payouts, lights, speakers, and bonus devices associated with player game play. The video gaming machine 800 can be further configured for providing additional features and services to the player in relation to game play and wagering on video gaming machine 800. These functions can be provided via hardware/software components located within video gaming machine 800 and/or can include or can require access or information from one or more external computing/storage devices to provide remote services 920 to players as part of an overall gaming environment for the player.

Remote services 920 can be provide using a combination of local and remote components. For example local components can be associated within the video gaming machine 800. Remote hardware and software can be used in conjunction with local components residing on the gaming machine to provide game/player bonusing, cashless services, player tracking, accounting and services, tournament services, progressive gaming, gaming services, and software/firmware services. As an example, the video gaming machine 800 can optionally include player tracking devices 918 and software for providing player services such as for example a player's affinity program further including for example one or more display, card reader, input buttons, speakers, and processors/memory. These player services can be provided using the player tracking devices 918 in conjunction with support from a remote player tracking server.

Turning to FIG. 6, a typical gaming environment within a gaming establishment such as a casino or gaming route location include gaming system 1000 comprising a plurality of servers 1020, devices 1022, 1024, 1026, operator interfaces 1016b, operator controlled devices 1002, wireless networks, one or more (Local Area Network) LANs 1012, and optional (Wide Area Network) WAN 1014 networks to support the player's gaming experience at one of a plurality of video gaming machine 1018 in a gaming establishment.

In one or more embodiments, servers 1020 offer a variety of player services and gaming environment functionality to the player such as for example player tracking servers, game download servers, accounting servers, bonus servers, cashless servers, and the like. Gaming establishment employees may monitor the gaming environment over gaming system 1000 using operator interfaces 1016a and 1016b. For example, an operator may be notified of the gaming system 1000 status including the operation of gaming machines such as gaming machine 1018 security events, financial accounting in the form of meters or reports, game play status, and other related events and communications.

In one or more embodiments, players may play games on any number of gaming devices connected on one or more LAN 1012 networks such as including thin client 1022 devices, mobile 1024 devices, video gaming machine 1018, and/or kiosks 1026. Additionally, players may visually perceive gaming jackpots and other exciting information over signage 1026. For example, a server can be configured to provide multiplayer games as previously described. The player can participate in these multiplayer games using operator controlled devices 1002 or player controlled devices 1010.

In one or more embodiments, player interfaces to a plurality of systems within gaming system 1000 offer gaming opportunities and entertainment to players. The operator may control and monitor operator controlled devices locally 1002 providing customer service and support among many other services provided by the gaming establishment.

All systems and devices within gaming system 1000 can be connected to a LAN 1012 providing connectivity between devices. Further, in some embodiments gaming system 1000 may include connectivity to additional devices and systems over WAN 1014. For example, operator controlled devices remote 1004 can provide services from external systems such as accounting, security, player tracking, and other casino related systems. Additionally, operator controlled devices remote 1004 may include gaming devices that can be played externally from the gaming establishment connected over WAN 1014 and may include additional connectivity over LAN 1012.

In one or more embodiments, third party or vendor controlled devices 1006 provide additional services and functionality for gaming system 1000 across WAN 1015 network. Additional services and functionality may include player tracking, accounting, wide area progressive games, bonusing, and other services and functionality that support the overall gaming experience of the player. Further, third party or vendor controlled devices can provide downloads of gaming software that are utilized on the operator controlled 1002. In one or more embodiments, gaming regulators responsible for insuring the integrity and security of gaming establishments in a particular jurisdiction may monitor and/or control gaming system 1000 devices and systems over WAN 1014 network and may include additional connectivity over LAN 1012 network. As previously described, these regulators can be responsible for approving gaming software and hardware, such as multiplayer game engine or a decision engine that can be utilized in the embodiments described herein.

In particular embodiments, players can play mobile player controlled devices 1010 within a gaming establish or external from a gaming establishment connected to gaming system 1000 over one or more wireless networks, LAN 1012 networks, and/or WAN 1014 networks. For instance, players can engage in multiplayer games with virtual players as previously described to learn behaviors of the virtual players. Games can be played by gaming players in this particular configuration using devices including but not limited to desktop 1030, lap top/mobile computer 1028a, cell phone or other hand held devices 1028*b*, and other similar devices. The player may be able to engage in these types of games during their trip to a gaming establishment or from a remote environment, such as within their home.

As an, a player can play games on video gaming machine 1018. This device can have features similar to those described with respect to FIGS. 5 and 6. A player would initiate game play by the insertion of currency or ticket/voucher with credit indicia into gaming machine 1018. When tickets/vouchers are inserted into video gaming machine 1018 by the player, video gaming machine 1018 communicates with servers 1020 to redeem ticket/vouchers. The server or server(s) determine whether the ticket/voucher are valid and notify the gaming machine 1018 whether the vouchers are valid or not. The player may optionally insert a player tracking card containing player information such as name and account number into video gaming machine 1018 which in turn communicates to player tracking servers 1020 across LAN 1012 network.

Video gaming machine 1018 would then present a game to the player or may present a number of game options for the player to select. Other player functionality and services provided by gaming system 1000 for video gaming machine 1018 during player game play are provided from servers 1020 over LAN 1012 network such as bonus servers, progressive game servers, and other related game servers further providing an exciting gaming experience for the player. Upon completion of game play by the player, the player may press a button on video gaming machine 1018 such as the cash out button which then may print out a ticket with credit indicia containing video gaming machine 1018 cash out credit information.

A gaming operator can provide players an opportunity to learn about the behavior in a context that does not require wagering of actual money. For instance, in one embodiment, a player could be provided an opportunity to purchase an application or an application could be provided for free that allows a player to engage in games against one or more virtual players on their player controlled devices 1010. While engaging in games the player can be afforded the opportunity to learn about the virtual player's behaviors and decision making strategies and play games against one or more various virtual players portrayed as virtual characters. For instance, a gaming operator can provide applications that can be utilized on a player's cell phone, such as an Iphone™, a portable gaming device, such as an Ipod Touch™, Nintendo DS™ or Sony PSP™, or a player's home computer. In another embodiment, a player can be allowed to access a virtual player via a connection to a remote server that is provided through a web-site. Further, a remote server can be provided to allow live players to be participating in games using their own devices that involve groups of live player and virtual players playing together where the remote server allows groups of live players to play together. In a casino environment, a bonus controller can provide access to games that enables casino players to play individually or as a group against virtual players.

In yet other embodiments, players can be afforded to play games and win awards that have some tangible value but are not necessarily cash but can be exchanged for items that have some value, such as loyalty points in a loyalty program. For instance, in a casino environment a player could be provided the opportunity to learn about a virtual player's behavior wagering loyalty points they have earned. These loyalty points are usually exchangeable for items offered by a casino, such as a free buffet or free nights stay. The player may be able to play wager-based games involving one or more virtual players and win additional loyalty points and/or lose additional loyalty points. Even when a player loses their loyalty points, the players can still benefit because they can learn behaviors of a virtual player that can help them in their play when they actually play for money at a casino.

In another embodiment, a player could be afforded the opportunity to learn behaviors of virtual players by playing games that require Xbox Live™ points, games could cost Xbox Live points or a player, as a promotion, could be provided Xbox live points for playing the games against the virtual players. This type of promotion could provide an opportunity for game makers to validate (e.g., their decision making capability and how players respond to the various characters) and market virtual players and virtual characters that are associated with various games provided by the game makers. Thus, the applications described herein do not necessarily involve wagering but can be applied any type of game where a virtual players make decisions. In general, the present invention is not limited to implementation in a casino based gaming environment or casino type games but can be utilized in any type of game or application where it may be advantageous to provide virtual players that make decisions and reveal their behavior during interaction with a live player.

Bill Playing Cards (Bcards)

Figure 7:
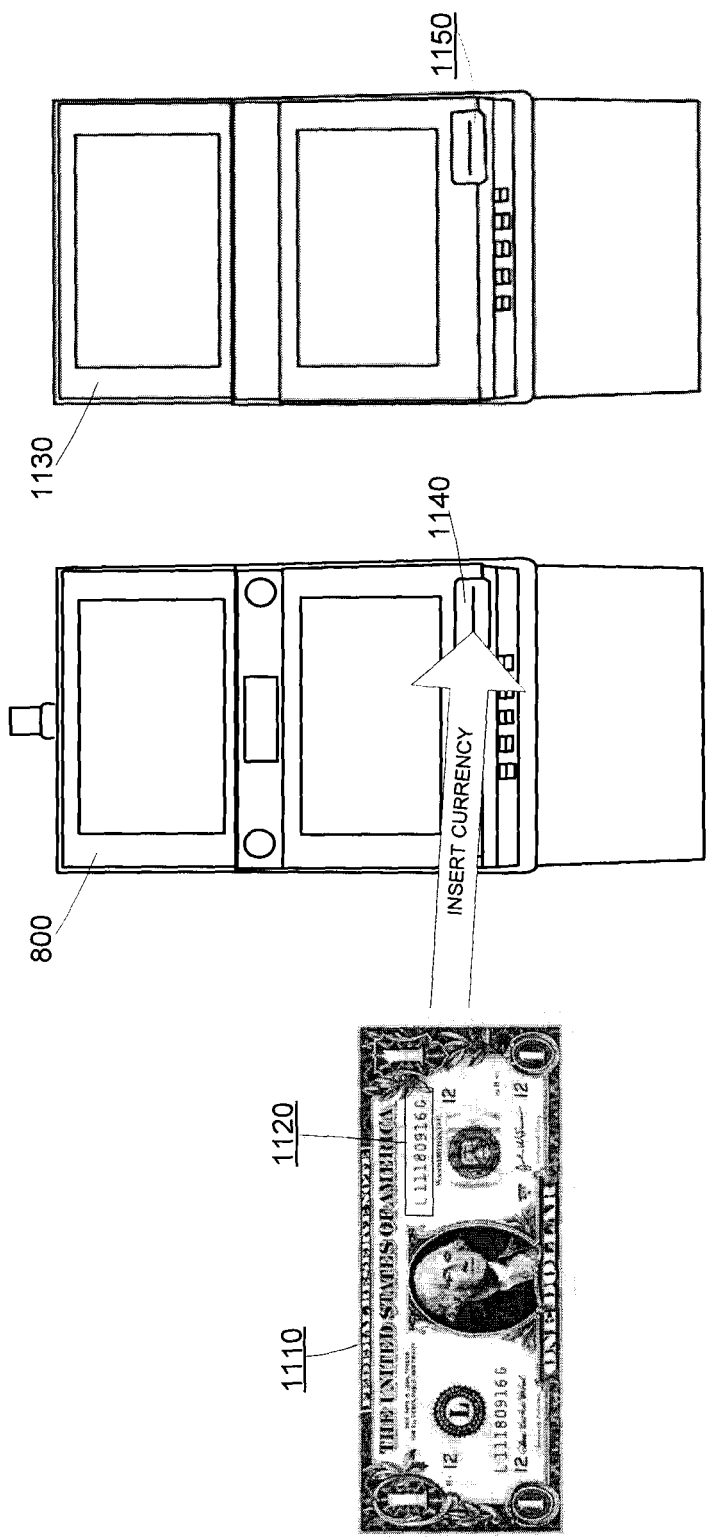
FIG. 7 is a front view of a gaming device and a kiosk showing where a bill is inserted for one embodiment of the present invention.

Turning to FIG. 7, in another embodiment, the invention can comprise a gaming device 800, gaming system or kiosk 1130 incorporating a value acceptor that accepts currency for example $1 1110, $5, $10, $20, $50, and $100 dollar bills.

The gaming device 800, gaming system or kiosk 1130 can be generally characterized as comprising a game controller, including a processor and a memory, designed or configured to control a play of a wager-based game played by two or more players where the wager-based game is played by at least a live player and a virtual player and where the live player or the virtual player can win the game, 2) receive information indicating a wager on an outcome of the play of the wager-based game from the live player, 3) receive decision information from each of the live player and the virtual player wherein the decision information received by the virtual player affects an amount won or lost by the virtual player; 4) determine the outcome of the wager-based game including determining whether the live player or the virtual player has won and 5) generate a presentation including the play of wager-based game and the determined outcome to the wager-based game.

Figure 8:
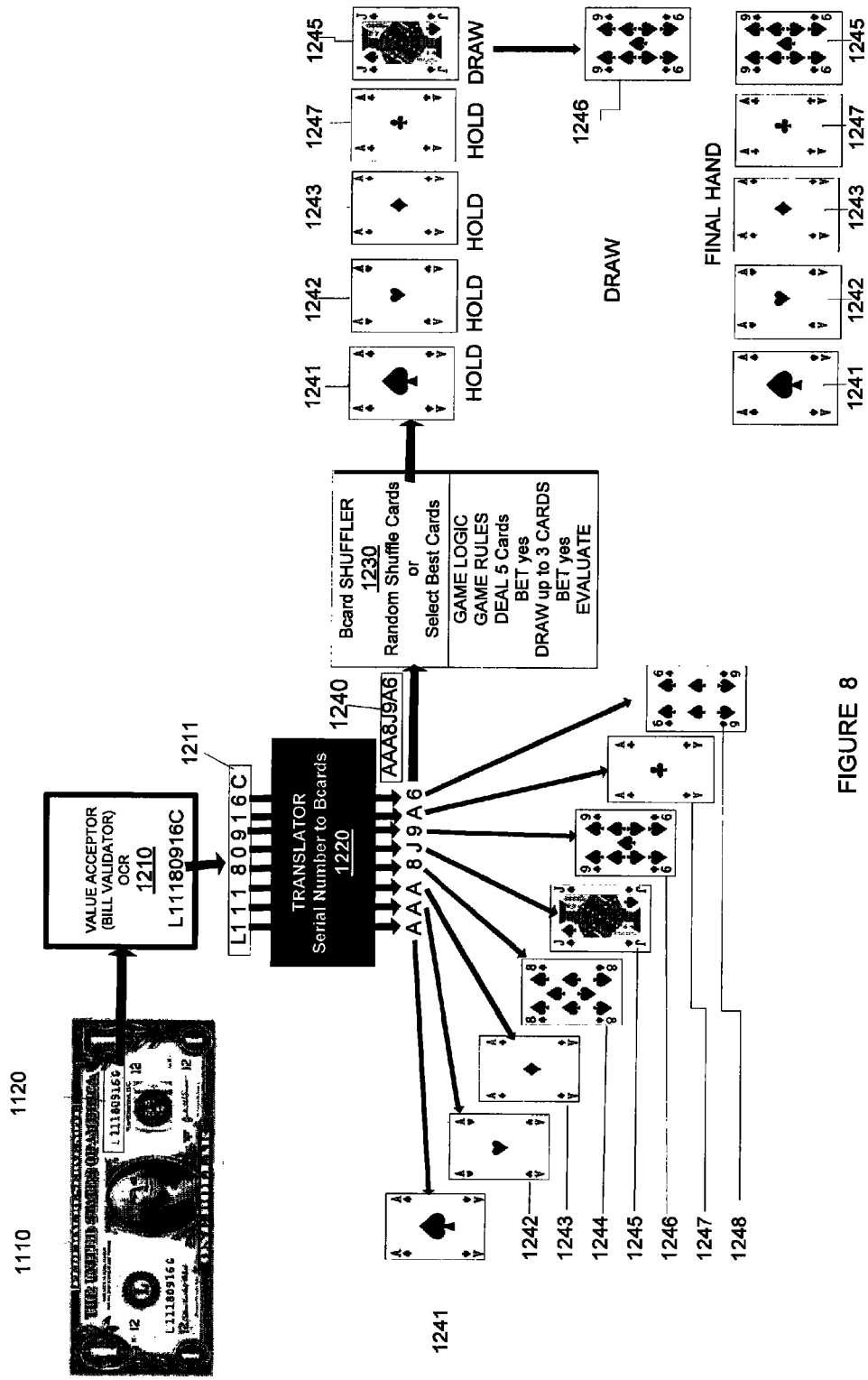
FIG. 8 is a block diagram of a Bcard 5-Card Draw game for one embodiment of the present invention.

Turning now to FIG. 8, in a particular embodiment, the gaming device, gaming system or kiosk incorporating a value acceptor 1210 configured to perform bill 1110 validation, additionally performs optical character recognition (OCR) on the bill to read the bill's serial number information 1120 and create a sequence of serial number digits 1211 readable by a computer. The value acceptor 1210 then communicates the sequence of serial number digits 1211 to a translator module 1220 configured to convert each bill serial number digit 1211 into a bill playing card (Bcard) 1241, 1242, 1243, 1244, 1245, 1246, 1247, 1248 as defined by a translator configuration file.

The conversion to Bcards 1241, 1242, 1243, 1244, 1245, 1246, 1247, 1248 within the translator module 1220 creates a plurality of Bcards 1241, 1242, 1243, 1244, 1245, 1246, 1247, 1248 that are then assembled into a Bcard deck 1240. In one embodiment, the Bcards can be selected from among cards into a standard 52 card playing deck.

The construction of a Bcard deck can be carried in number of different manners. In one embodiment, a one to one correspondence can be used to construct a deck such that the number of symbols corresponds to the number of Bcards in the Bcard deck. For instance, as shown in the FIG. 8, eight numbers on the bill are translated to eight cards. These eight cards may make up the Bcard deck for the player.

In other embodiments, the gaming device can be configured to add additional Bcards to the Bcard deck. For instance, 8 cards can be determined from the currency inserted into the gaming device and then the gaming device can generate additional random numbers, such as 5 numbers, to fill out a 13 Bcard deck or 8 numbers to fill out a 16 Bcard deck. In another embodiment, the gaming device can provide a "standard portion" of the Bcard deck that remains the same from game to game, such as 10 cards that are always in the Bcard deck and that are augmented by 8 cards determined from currency inserted into the gaming device.

In one embodiment, a Bcard deck can be constructed from a single bill of currency inserted into a gaming device. In another embodiment, a Bcard deck can be constructed from multiple bills inserted into the gaming device. For instance, a Bcard deck with 20 cards can be constructed. If a player enters, 1 bill, then 8 cards are determined for the Bcard deck and the rest are selected randomly for the player. If a player enters, 2 bills, then 16 cards can be selected for the Bcard deck and then 4 additional cards can be randomly selected.

In another embodiment, an event can be generated when a player inserts multiple bills extending beyond allowable regulatory limits for money laundering or extending beyond limits set by the casino. For example if a casino is interested in flagging an event when an amount above $1500 occurs within a configurable time interval such as 5 minutes, the bill validator generates an event and communicates it via a message to the gaming machine which in turn communicates the event along with location information and optional player information via a message to the online system when the eleventh one hundred dollar bill is inserted within five minutes. The event may then sound an alarm, generate a pop-up window on a security monitor or route an email or instant message to an on-call operator. Configurable parameters include the amount, the number of bills and the time interval.

In the Figure, all of the numerical digits on the bill are shown as being translated into Bcards. In some embodiments, only a portion of the digits may be used. For instance, one method for constructing a Bcard deck might involve tossing out the highest digit and the lowest digit. Another method for constructing a Bcard deck might involve using the 7 highest digits or the 7 lowest digits. In yet another embodiment, a portion of the Bcards that are generated may only be used. For instance, 8 Bcards can be generated from the numerical information on the bill and then one of the 8 Bcards can be randomly selected and removed from the Bcard deck.

In another aspect of the invention, the Bcard deck 1240 is shuffled using a shuffler module 1230 based on a shuffler configuration file defining how individual Bcards are dealt to the player for a player selected card game such as, for example, randomly dealt to the player, best card dealt to the player, player selected, worst card, high card, low card, or other methods for dealing cards for a particular card game defined by the shuffler module configuration file.

For example, if the player played a five card draw game against a paytable, virtual player, live player, group of live players or combination of live and virtual players using traditional five poker hand card rules. Rules for various for various card games are described in such sources as "Bicycles Official Rules of Card Games" or "Hoyle's Modern Encyclopedia of Card Games: Rules of All the Basic Games and Popular Variations."

Using the Bcard deck and depending on the game, the player can be dealt a number of cards. For instance, the player can be dealt five Bcards 1241, 1242, 1243, 1247, and 1245. The gaming device can be to hold or draw various Bcards. For instance, the player may wish to HOLD Bcard 1241, 1242, 1243, 1247 and DRAW a new Bcard for 1245. The player is then dealt Bcard 1246 from the Bcard deck to replace Bcard 1245. The final hand comprising Bcards 1241, 1242, 1243, 1247, and 1245.

Figure 9:
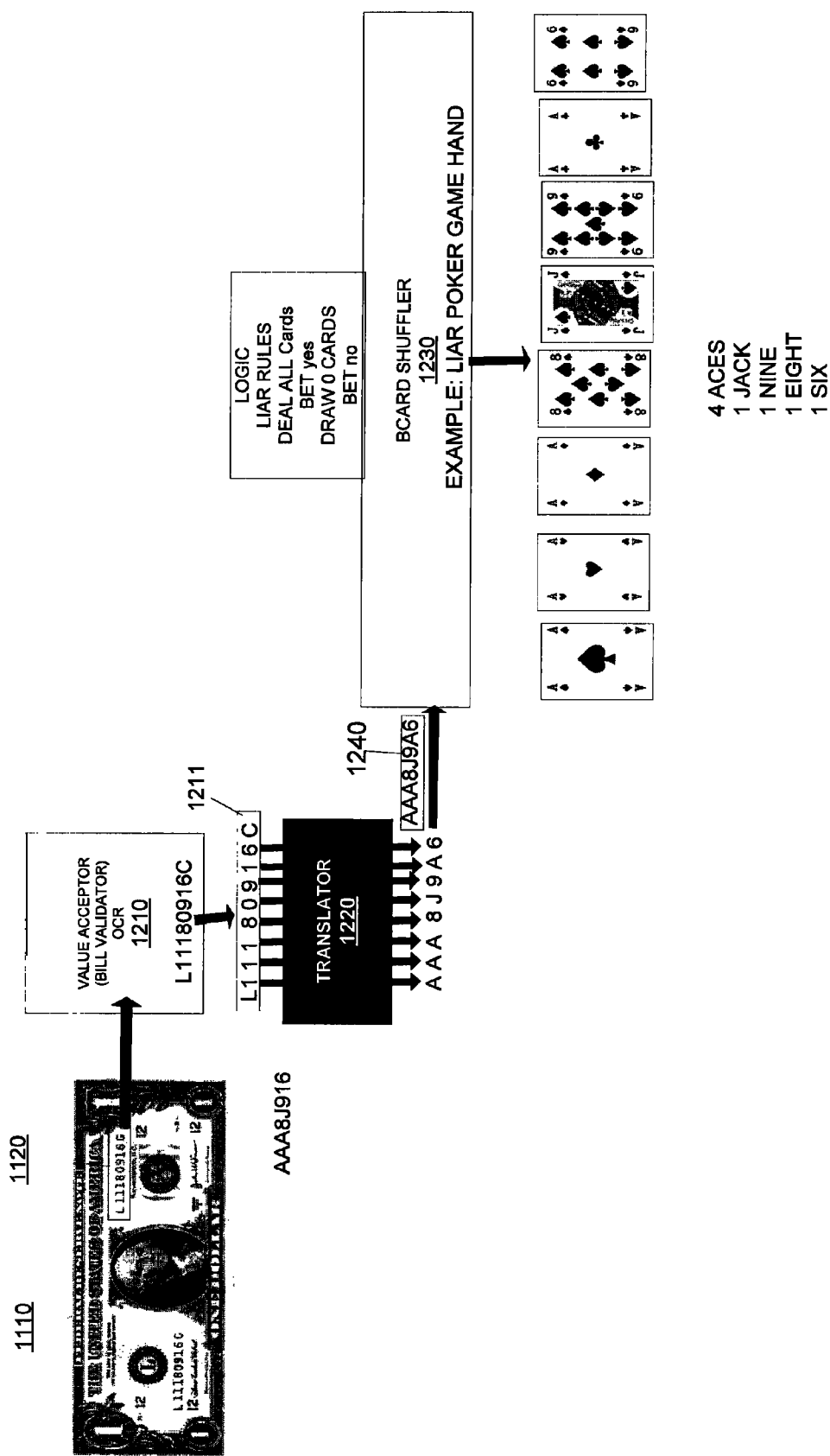
FIG. 9 is a block diagram of a Bcard Liar's Poker game for one embodiment of the present invention.

Turning to FIG. 9, in another example, the player plays a well-known game called Liar's poker. In Liar's poker, the objective is to make the highest bid of a number that does not exceed the combined total held by all the players. The numbers are usually ranked in the following order: 2,3,4,5,6,7,8, 9,0 (10) and 1 (Ace). If the first player bids three 6s, he is predicting there are at least three 6s among all the players, including him. The next player can bid a higher number at that level (three 7s), any number at a higher level (four 5s) or challenge. The end of the game is reached when a player makes a bid that is challenged all around. If the bid is successful, he wins a dollar from each of the other players, but if the bid is unsuccessful, he loses a dollar to each of the other players.

In this game, the gaming device provides the player with a Bcard deck of Bcards 1240, the Bcard deck is shuffled by Bcard shuffler 1230 and dealt to the player. As described above, the Bcard deck composition can be based at least partly upon information obtained from a bill inserted into a gaming machine by a player. In the example shown in the Figure, the player now has the following Bcards: 4 Aces, 1 Jack, 1 Nine, 1 Eight, and 1 Six then plays this set of dealt cards against other live players, virtual players or combination thereof according to the rules of Liar's poker as described by the Wizard of Odds or other well known variations of the game.

Liar's poker, as well as other poker games, can involve bluffing. As previously describe, bluffing by a virtual player can be simulated. The bluffing can involve animating a virtual player's emotional state. The animation may provide cues indicating whether the virtual player is bluffing or not.

In one version of Liar's poker, outcomes are based on the digits from all of the player's currency. For instance, for a three player game, the total number of threes from each of the three player's currency. Each player has partial information, i.e., they are aware of their own "cards," based upon the numbers that their currency included. Thus, for this game, the Bcard deck can consist of Bcards determined from the currency provided by each player.

In the case of a virtual player, such as a real player playing against a virtual player or a combination of real and virtual players, the receiving of a virtual player's currency can be simulated. For instance, a gaming device simulating a virtual player can select random digits to correspond to the digits that can be read from an inserted bill. The digits selected for the virtual player and digits read from a bill inserted from a live player can be used to construct the Bcard deck. The virtual player's play can be simulated based on random digits selected for the virtual player, i.e., the random and virtual player can have access to the same level of information. If the virtual player wins, then the live player loses a wager. If the live player wins, then the live player can receive a credit on the gaming device at which they are playing.

Figure 10:
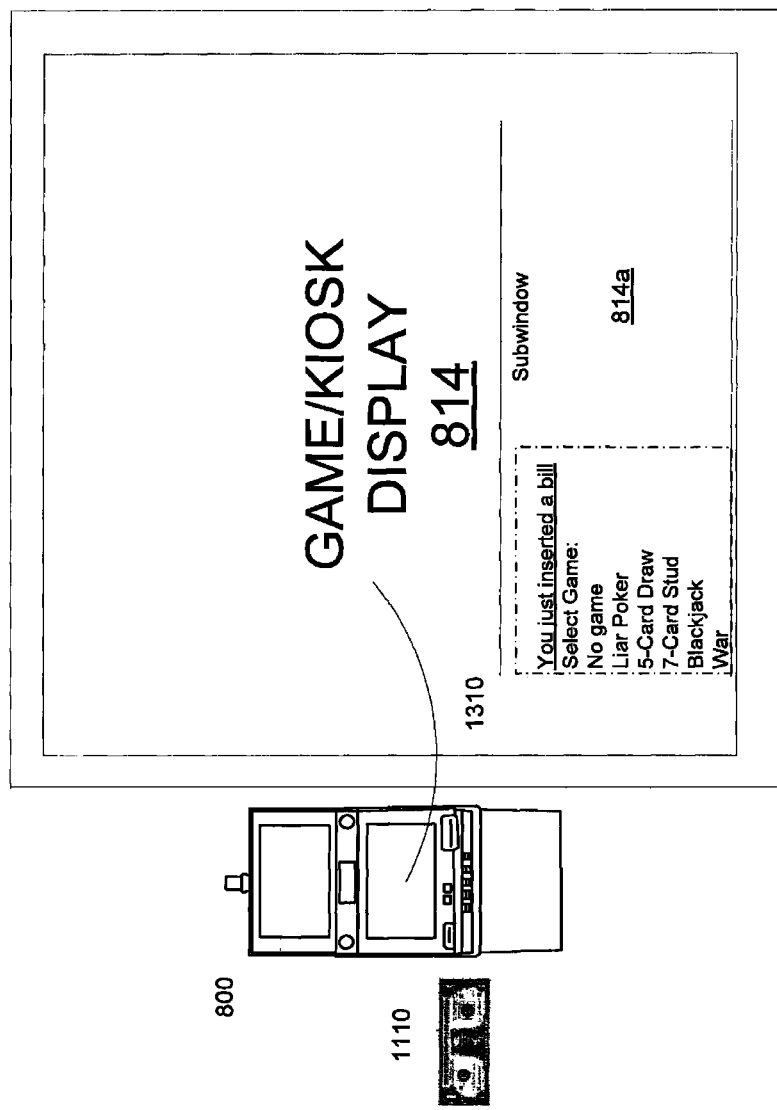
FIG. 10 is a front view of a gaming device and display with a subwindow for one embodiment of the present invention.

Turning to FIG. 10, in another aspect, dollar bill 1110 is inserted into the value acceptor of gaming device 800 resulting in a Bcard deck that is further shuffled and used by the player to play a player selected card game. In one embodiment, the gaming device 800 incorporates a game display 814 further presenting a Subwindow 814a to the player notifying the player with a message 1310 in the Subwindow 814a that a bill has been inserted and offers the player the opportunity to make a selection: No game, Liar Poker, 5-Card Draw, 7-Card Stud, Blackjack, or War, wherein if the player selects a game the game being played using Bcards from a Bcard deck. In another embodiment, the group of games may comprise any card based game using any set of game rules.

In yet another aspect, the player selects one of a plurality of game play options including 1) playing the card game using the Bcard deck against a predefined paytable, 2) playing the game using the Bcard deck against one or more other players, each of whom uses their own Bcard deck assembled from the serial numbers obtain from bills the player inserted in a value acceptor, 3) playing the game using the Bcard deck against one or more virtual players, each virtual player using its own Bcard deck; wherein each Bcard is randomly drawn from a set of possible Bcards then assembled into a Bcard deck, or 4) playing the game using the Bcard deck against one or more other physical players and virtual players.

Figure 11:
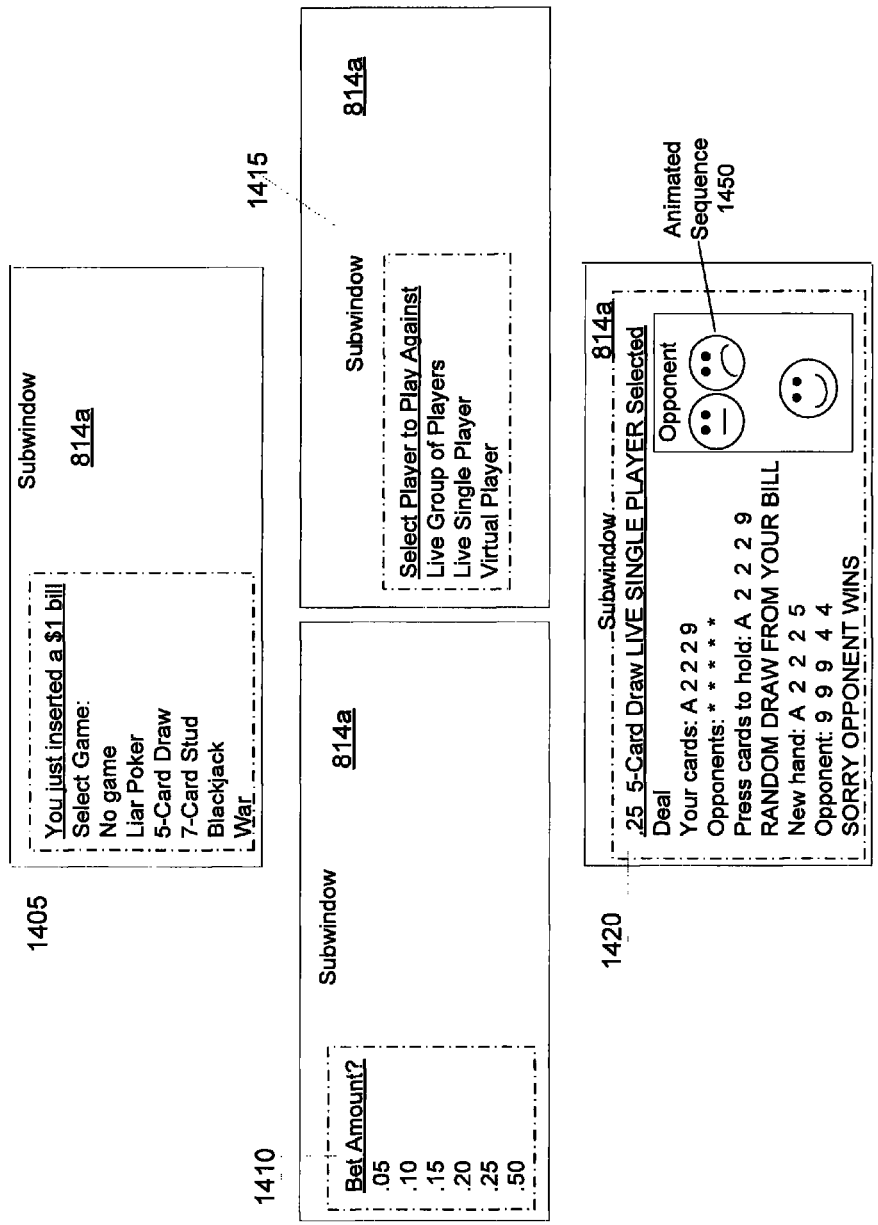
FIG. 11 illustrates aspects of wager-based multi-player Bcard games including virtual and live players for embodiments of the present invention.

Turning to FIG. 11, in another aspect of the invention, the player is provided a Subwindow 814*a* presenting an option 1405 to play a Bcard card game upon insertion and validation of a bill into a value acceptor.

Upon selection of a presented option 1405, with the exception of the No game option, the player is presented with a new set of options 1410 whereupon the player selects the amount to be wagered.

Next, the player is presented with a new set of options 1415 in the Subwindow 814*a* allowing the player to select with whom the game will be played. For example a Live Group of Players, Live Single Player, Virtual Player. In one embodiment wherein the player desires to play against one or more other live player(s), the player selects the game and wager from a subwindow and waits for other live player(s) to join the game. The subwindow operations display concurrent with other operations on the gaming device, kiosk or gaming system allowing the player to perform multiple tasks concurrently such as playing a game on the main display of the gaming device, kiosk or gaming system, playing a game on a subwindow of a gaming device, kiosk or gaming system, and playing a game using Bcards in another subwindow of a gaming device, kiosk or gaming system.

In other embodiments, the player may choose a paytable option allowing the player to play against a predefined paytable for a particular selected game option and/or may choose any combination of options involving paytables, live players, and virtual players.

Upon selection of options 1415 in Subwindow 814*a*, the player plays the game in Subwindow 814*a* while interacting with those players selected in option 1415 wherein game actions and results 1420 along with optional animated sequences 1450 are displayed in Subwindow 814*a*.

Figure 12:
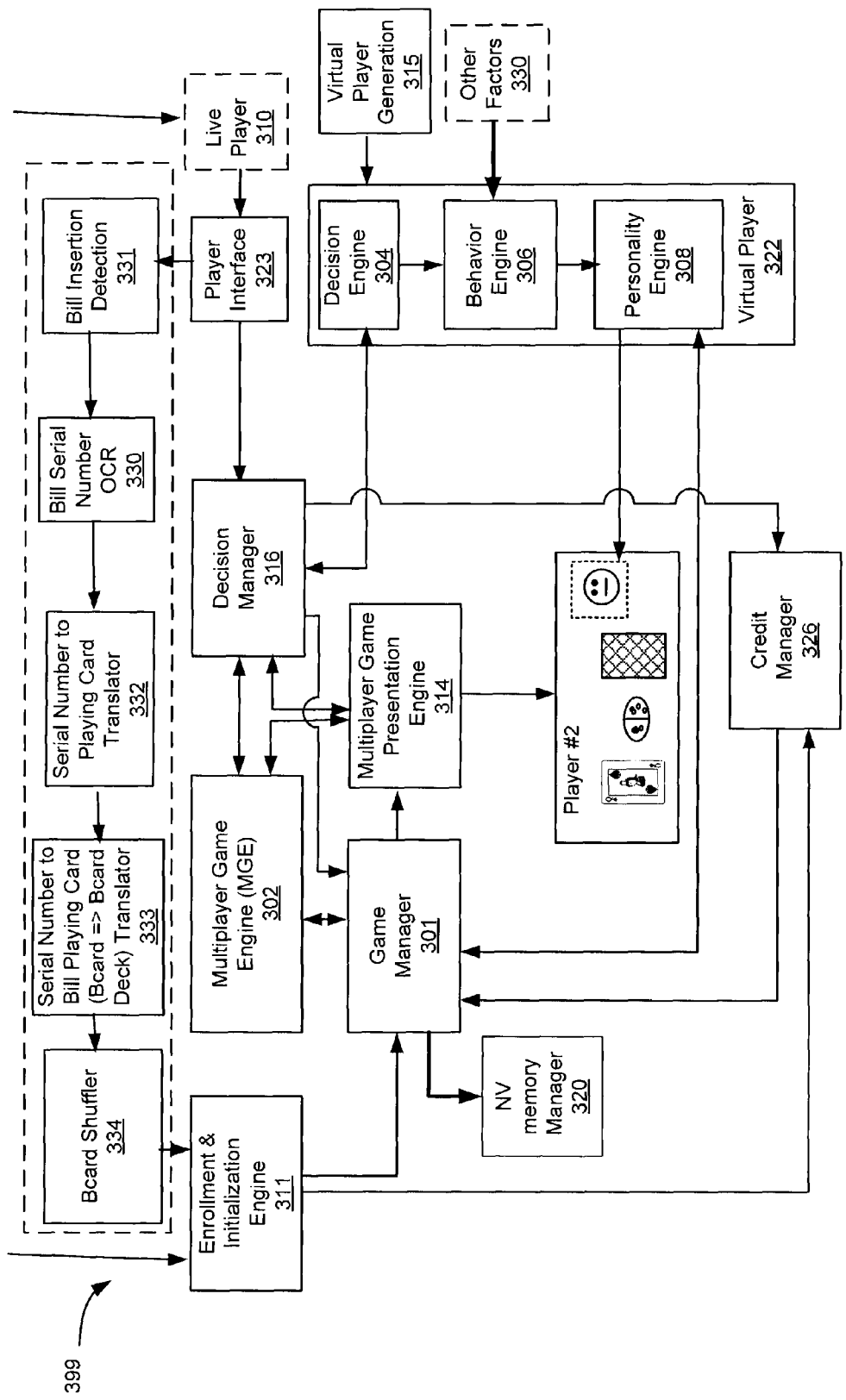
FIG. 12 is a multi-player gaming system incorporating Bcard card games for one embodiment of the present invention.

Turning to FIG. 12, in one embodiment, the player interface 323 further communicates with Bill Insertion Detection 331, Bill Serial Number OCR 330, Serial Number to Playing Card Translator 332, Serial Number to Bill Playing Card (Bcard) Translator creating a Bcard Deck, and a Bcard Shuffler 334 to be used when the player selects to play within the Enrollment and Initialization Engine 311.

In other embodiments the modules are distributed between various physical devices such as the value acceptor (Bill Validator), gaming device, kiosk, gaming system, and other physical devices.

In other embodiments the modules are incorporated on a single physical device such as a value acceptor (Bill validator), kiosk, gaming device, gaming system, or other physical devices.

Figure 15:
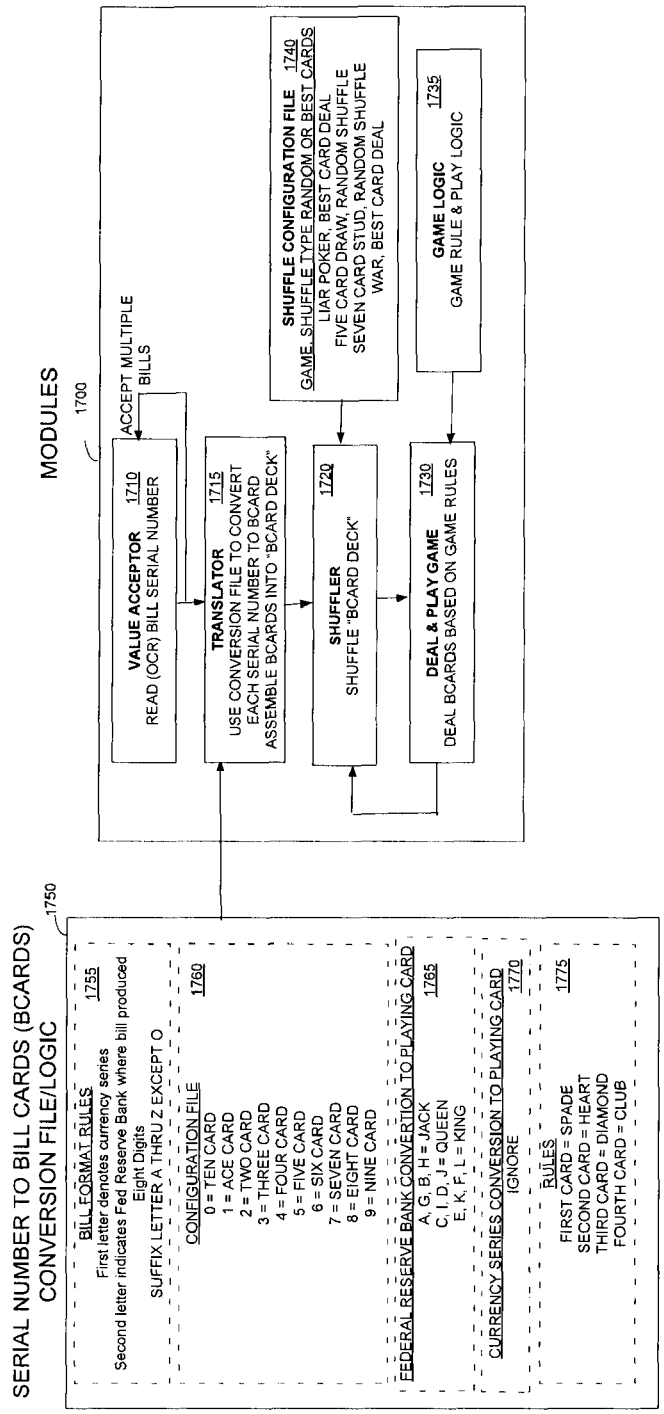
FIG. 15 is a block diagram of the modules and configuration files for one embodiment of the present invention.

Turning to FIG. 15, in one embodiment a serial number to bill cards (Bcards) conversion file/logic 1750 is used by the translator 1715 in order to convert a particular bill serial number to Bcards, further creating a Bcard deck. In one example, the Conversion file/logic 1750, includes Bill Format Rules 1755 describing the format of the bill serial number. A conversion file 1760 provides rules for converting each particular digit of a bill serial number into a specific Bill Playing Card (Bcard). Additional conversion information converting information such as the Federal Reserve Bank identification to a Playing Card 1765 may also be included. Additionally, the Currency Series 1770 may also be used to convert into a Bcard or ignored. Rules 1775 for game play may also be included within the Conversion file/logic 1750.

In other embodiments, other information may also be included in the Conversion file/logic 1750 associated with conversion of readable information from a bill into a Bcard.

In other embodiments, other logic may also be included in the Conversion file/logic 1750 associated with game play with Bcards from a Bcard deck.

In one embodiment, the Shuffler 1720 shuffles and deals the Bcards to the player according to the rules defined within the Shuffle Configuration File 1740. For example, when the player plays 5-Card Draw poker, the Bcards dealt to the player will be randomly shuffled and dealt to the player with the limit of 2 DRAW cards.

In another example, the player may be dealt all Bcards when playing Liar's poker along with a summary of the Bcards such as 4 Aces, 1 Jack, 1 Nine, 1 Eight, and 1 Six in order for the player to interact with other Live players or virtual players playing the game.

In another example, the player may be dealt the "best card" first when playing the card game WAR.

In one embodiment, the player is dealt cards 1730 and plays the game based on game logic 1735 defining the rules and logic of playing a particular card game.

Figure 14:
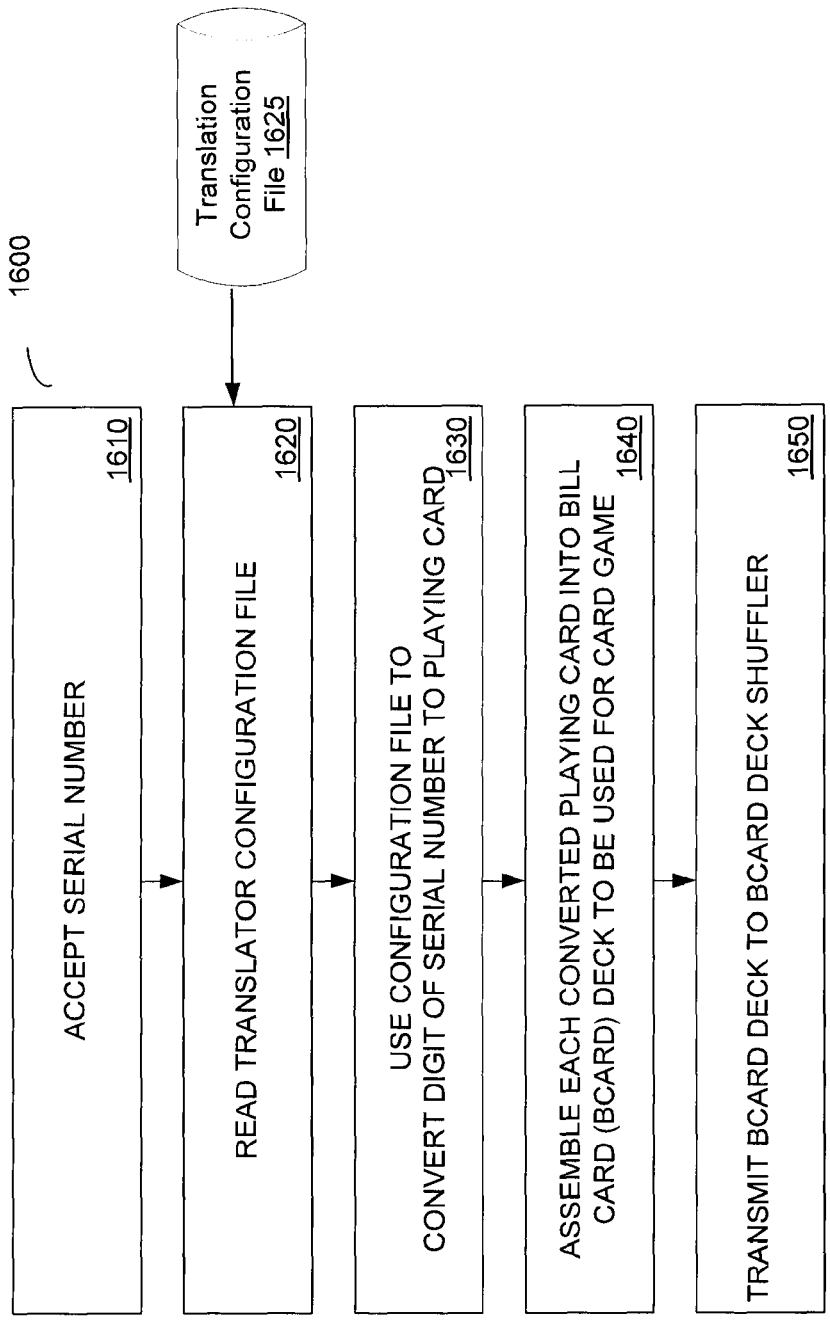
FIG. 14 is a method for converting a bill serial number into a Bcard Deck

Turning to FIG. 14 is a method for converting a bill serial number into a Bcard Deck. In 1610, a serial number is read from a denomination of currency such as from a US $1 dollar bill. Various methods for reading characters from a denomination currency are well known including but not limited to Optical Character Recognition (OCR).

In 1620, a Translator configuration file 1625 is read by the present invention to prepare the conversion of a denomination of currency into playing cards wherein each serial number digit is to be converted into a bill playing card (Bcard).

In 1630, the conversion of a denomination of currency serial number digit is converted into a Bcard using the translator configuration file as previously described.

In 1640, each Bcard is assembled into a Bcard deck for use in a card game.

In 1650, the Bcard Deck is communicated to the Bcard Deck Shuffler which will further use the Bcard Deck to deal individual Bcards to a player for a selected card game.

Figure 13:
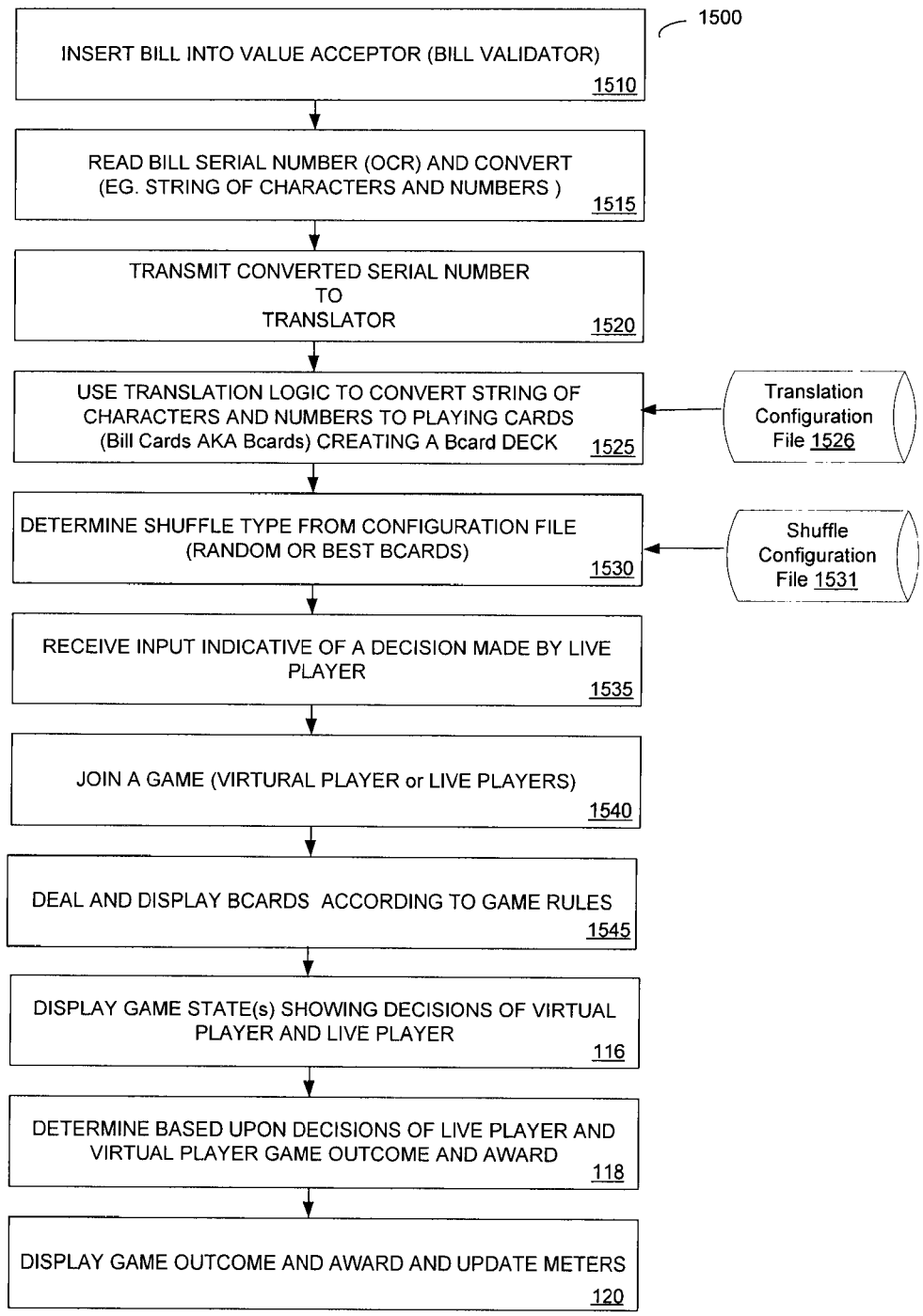
FIG. 13 is a method for providing playing cards (Bcards) derived from an inserted Bill serial number and play a card game using a Bcard deck.

Turning now to FIG. 13 is a method 1500 for providing playing cards (Bcards) derived from an inserted denomination of currency (aka a bill) serial number and play a card game using a Bcards from the Bcard deck.

In 1510 a denomination of currency or bill is inserted into the value acceptor (aka Bill Validator) of a gaming device, kiosk or other device accepting currency.

In 1515, the bill serial number is read by the present invention using for example optical character recognition (OCR) and converted into computer readable digits such as a string of characters and numbers in one embodiment of the invention.

In 1520, the converted bill serial number is transmitted or communicated to the present invention's translator module.

The transmission may be between modules on a single physical device or may include a plurality of modules on a plurality of physical devices.

In 1525, translation logic and conversion information is used from the translation configuration file 1526 to convert the string of characters and numbers read from the bill into bill playing cards (Bcards).

In 1530, a shuffler configuration file 1531 is used to determine how the Bcards will be dealt to the player for a particular game.

In 1535, the player selects to play a card game offered by the present invention. For example, the player may be notified that the present invention detected the insertion of a denomination of currency (bill) into a value acceptor. The player is then given the opportunity to play a card game using Bcards, amount to wager and with whom to play (paytable, live players, virtual players, or some combination thereof).

In 1540, the player is given the opportunity to join a game using Bcards with virtual players, live players or any combination thereof.

In 1545, Bcards are dealt and displayed to the player according to game rules.

In 116, gaming device can be configured to output various game states. The game states can include but are not limited to visual and/or auditory output that indicate information about game positions and decisions made by each of the virtual and live players as the game progresses. In 118, at the end of the game, based upon each of the player's final game position and/or decisions made by each of the live and virtual players, a game outcome can be determined. In some embodiments, the game outcome may be that one of the virtual or the live player is victorious, which determines whether the live player receives an award. In other embodiments, depending on how the live player played the game, an initial wager, a final position of the live player in the game, which can vary from game to game and combinations thereof. An award associated with the outcome of the game for the live player can be determined.

In 120, the gaming device can be configured to output a game outcome and its associated award. In the case of a casino type gaming machine, the gaming device can be configured to update meters and credit information. In various embodiments of the invention, awards may include the amount wagered, some multiple of the amount wagered based on game odds, the player's opponents wagers, the virtual players wagers, a derivative of the wager placed, a progressive amount associated with a wager placed, a physical prize, a combination of cash and prize, or any other combination thereof associated with awarding the player for playing the game.

The various aspects, embodiments, implementations or features of the invention can be used separately or in any combination. The invention can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape and optical data storage devices. The computer readable medium can also be distributed over network-coupled computer systems so that the computer readable code is stored and executed in a distributed fashion.

The various aspects, embodiments, implementation or features of the invention can be used within a gaming establishment such as a casino or route, retail establishment such as a grocery store, mall, or parking facility, or any location where kiosks or related devices are available such as an airport, sidewalk, center centre, bar, club, and the like.

The various aspects, embodiments, implementation or features of the invention can be used over a wide area where players may be located in any local, regional, state, national, or worldwide location allowable by all applicable laws, regulations and commerce rules and regulations.

The advantages of the invention are numerous. Different aspects, embodiments or implementations may yield one or more of the following advantages. One advantage can be casino games that combine the behavioral aspects of poker with the profitability of slot machines. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A gaming device comprising:
   a cabinet;
   a security system, coupled to the cabinet, configured to monitor access to the cabinet;
   a video display, coupled to the cabinet, configured to display a presentation of a wager-based game;
   a bill/ticket acceptor, coupled to the cabinet, configured to receive currency or printed ticket vouchers which are converted into credits used to make wagers on the wager-based game;
   a printer, coupled to the cabinet, configured to print and output ticket vouchers to cash out the credits;
   input buttons, coupled to the cabinet, configured to receive inputs from a live player which plays the wager-based game;
   a game controller, including a processor and a memory, disposed within the cabinet and coupled to the security system, the video display, the bill/ticket acceptor, the printer and the input buttons, designed or configured to control a play of the wager-based game played by two or more players wherein the wager-based game is played by at least a live player and a virtual player and wherein the live player or the virtual player can win the game, 2) receive, via the input buttons, information indicating a wager on an outcome of the play of the wager-based game from the live player wherein the wager is made using the credits, 3) receive decision information from each of the live player and the virtual player wherein the decision information received by the virtual player affects an amount won or lost by the virtual player; 4) determine the outcome of the wager-based game including determining whether the live player or the virtual player has won and 5) generate the presentation including the play of the wager-based game and the determined outcome to the wager-based game; 6) control output of the presentation to the video display; 7) receive security information from the security system and 8) control the printer to cash out the credits;
   a multi-player game engine configured to a) progress the wager-based game from an initial position to a final position for each of the live player and the virtual player; b) request the decision information from each of the live player and the virtual player and receive the decision information relating to decisions made by each of the live player and the virtual player;

a bill card game engine comprising,
  a translator configured to translate each serial number digit from a denomination of currency into a bill card for use in playing a card game;
  a plurality of bill cards assembled into a bill card deck; and
  a shuffler to shuffle the bill card deck; and
a virtual player, instantiated by the game controller, configured to make the decisions requested by the multi-player game engine during the play of the wager-based game, said virtual player comprising,
  a decision engine configured to make the decisions requested by the multi-player game engine based upon at least a current position of the virtual player in the wager-based game;
  a behavioral engine configured to determine when to a trigger a behavior of the virtual player wherein the behavior when correctly interpreted by the live player increases a live player's chance of winning the wager-based game played against the virtual player; and
  a personality engine configured to receive, when the behavior is triggered, information regarding the behavior, determine an action of a virtual character that is generated in response to the behavior; wherein a second presentation of the virtual character performing the determined action is output to the video display.

2. A gaming device comprising:
a cabinet;
a security system, coupled to the cabinet, configured to monitor access to the cabinet;
a video display, coupled to the cabinet, configured to display a presentation of a game;
a value acceptor, coupled to the cabinet, configured to receive a value instrument which is converted into credits used to make wagers on the game;
a value dispenser, coupled to the cabinet, configured to cash out the credits;
input buttons, coupled to the cabinet, configured to receive inputs from a live player which plays the game;
a game controller, including a processor and a memory, disposed within the cabinet and coupled to the security system, the video display, the value acceptor, the value dispenser and the input buttons, configured to 1) generate the game wherein the game is played between at least one live player and at least one virtual player; 2) receive, via the input buttons, first decision information associated with the live player's play of the game; 3) determine second decision information associated with the virtual player's play of the game; 4) advance the game from a first position to a second position based upon the first decision information, the second decision information or combinations thereof; 5) generate a visual presentation of the first position and a visual presentation of the second position; 6) to determine behavioral information associated with the virtual player; 7) to generate a visual presentation of the behavioral information; 8) output the visual presentation of the first position, the visual presentation of the second position and the visual presentation of the behavioral information to a display wherein the behavioral information when correctly interpreted by the live player increases a live player's chance of winning the game played against the virtual player; 9) determine a winner of the game from among at least the virtual player and the live player; 10) receive security information from the security system and 11) control the value dispensing device to cash out the credits.

3. The gaming device of claim 2, wherein the value acceptor is a bill/ticket acceptor or a card reader.

4. The gaming device of claim 2, wherein the value dispenser is a printer.

5. The gaming device of claim 2, wherein the input buttons include a touch screen.

6. The gaming device of claim 2, wherein the behavioral information is selected to reveal information related to one of a current game position of the virtual player, a decision made by the virtual player, a decision to be made by the virtual player, a game strategy of the virtual player or combinations thereof.

7. The gaming device of claim 2, wherein the game controller is further configured to detect an event that triggers an output of the behavioral information wherein behavioral information is determined in response to detecting the event.

8. The gaming device of claim 7, wherein the event is associated with one or more of a current game position of the virtual player, a past game position of the virtual player, a winning streak of the virtual player, a losing streak of the virtual player, a game state of the game which requires the virtual player to make a decision, a decision made by the live player, a random factor or combinations thereof.

9. The gaming device of claim 2, wherein the game controller is further configured to output information in a textual format which describes a meaning of the behavioral information.

10. The gaming device of claim 2, wherein the live player plays the game as part of a team.

11. The gaming device of claim 2, wherein the game is played by one of a plurality of live players, a plurality of virtual players or combinations thereof.

12. The gaming device of claim 2, wherein the game is a poker game.

13. The gaming device of claim 2, wherein the first decision information, the second decision information or combinations thereof is associated with a bet using all or a portion of the credits.

14. The gaming device of claim 2, wherein the visual presentation of the behavioral information includes one or more of images of a virtual character associated with the virtual player.

15. The gaming device of claim 14, wherein the virtual character is a human or non-human character.

16. The gaming device of claim 2, wherein the credits are redeemable for cash or points.

* * * * *